(12) United States Patent
Koga

(10) Patent No.: US 8,670,193 B2
(45) Date of Patent: Mar. 11, 2014

(54) OPTICAL SYSTEM AND OPTICAL APPARATUS USING THE SAME

(75) Inventor: Hironobu Koga, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/596,247

(22) Filed: Aug. 28, 2012

(65) Prior Publication Data

US 2013/0063648 A1  Mar. 14, 2013

(30) Foreign Application Priority Data

Sep. 8, 2011 (JP) .................................. 2011-195997

(51) Int. Cl.
*G02B 9/04* (2006.01)

(52) U.S. Cl.
USPC ............ 359/793; 359/761; 359/770; 359/781

(58) Field of Classification Search
USPC ......... 359/642–661, 733–736, 754–756, 761, 359/763, 770, 771, 781–784, 793; 396/72–88; 348/240.99–240.3, 348/335–369
See application file for complete search history.

(56) References Cited

FOREIGN PATENT DOCUMENTS

| JP | 5142474 A | 6/1993 |
|---|---|---|
| JP | 2007333790 A | 12/2007 |

*Primary Examiner* — Ricky Mack
*Assistant Examiner* — Gary O'Neill
(74) *Attorney, Agent, or Firm* — Canon USA Inc. IP Division

(57) ABSTRACT

An optical system includes a negative lens unit including one or more negative lenses located closest to an object side, and a positive lens unit having positive refractive power including a plurality of lenses on an image side of the negative lens unit. When the one or more negative lenses are denoted by negative lenses LNi (i=1, 2, . . . ) in order from the object side, and a portion of lenses among the plurality of the lenses constituting the positive lens unit is denoted by lenses LAj (j=1, 2, . . . ) in order from the object side, a focal length fni of the negative lens LNi, a refractive index Nni of a material thereof, a focal length fAj of the lens LAj, a refractive index NAj, and partial dispersion ratio θgFAj of a material of the lens LAj are set to satisfy respective predetermined conditions.

9 Claims, 16 Drawing Sheets nd – υd

θgF – υd

OPTICAL SYSTEM AND OPTICAL APPARATUS USING THE SAME

BACKGROUND OF THE INVENTION

1. Field of the Invention

The present invention relates to an optical system which is appropriate for an optical apparatus such as a silver-halide film camera, a digital still camera, a video camera, a telescope, a binoculars, a projector, or a copying machine.

2. Description of the Related Art

Japanese Patent Application Laid-Open No. 2007-333790 discuses a Gauss lens (optical system) as a standard photographic lens having a photographic angle of view of about 45 degrees used for a single-lens reflex camera. Typically, a Gauss lens consists of two lenses; in its most basic form, a positive meniscus lens on the object side and a negative meniscus lens on the image side. The power of the positive lens generally predominates, but the negative lens corrects for chromatic aberration. The Gauss lens has features of having relatively long back focus, a wide angle of view, and a large diameter ratio and capable of easily obtaining high optical performance. In addition, Japanese Patent Application Laid-Open No. 05-142474 discuses a Gaussian photographic lens, in which focusing is performed by changing a relative relationship between lens units so as to reduce variation in aberration due to a change in object distance.

In a large-aperture-ratio Gauss lens, in order to achieve high optical performance in a range from on the axis up to the margin of the image plane, a lanthanum flint glass containing lanthanum is mainly used as a material of a positive lens, and a titanium flint glass containing titanium is mainly used for a negative lens.

However, if such a material is used, a secondary spectrum of axial chromatic aberration is increased, so that it is difficult to correct the secondary spectrum of axial chromatic aberration. Therefore, in a large-aperture-ratio Gauss lens, it is important to reduce color flare caused by the secondary spectrum of axial chromatic aberration.

Therefore, with respect to the Gaussian lens or a modified Gauss lens as a modification of the Gaussian lens, in order to obtain high optical performance by reducing the secondary spectrum of axial chromatic aberration, it is important to appropriately select a material of each lens. For example, it is important to use the lenses of which a refractive index, Abbe number, partial dispersion ratio (relative partial dispersion), and the like of a material are appropriately selected.

SUMMARY OF THE INVENTION

According to an aspect of the present invention, an optical system includes: a negative lens unit including one or more negative lenses located closest to an object side; and a positive lens unit having positive refractive power including a plurality of lenses on an image side of the negative lens unit, wherein, when a portion of lenses among the plurality of the lenses constituting the positive lens unit is denoted by lenses LAj (j=1, 2, ...) in order from the object side, and an anomalous partial dispersion ratio of a material of the lens LAj is denoted by $\Delta\theta gFAj$, following condition is satisfied:

$$\Delta\theta gFAj > 0.0025, \text{ and}$$

wherein, when the one or more negative lenses are denoted by negative lenses LNi (i=1, 2, ...) in order from the object side, a focal length of the negative lens LNi and a refractive index of a material thereof are denoted by fni and Nni, respectively, a focal length of the lens LAj is denoted by fAj, a refractive index, Abbe number, and partial dispersion ratio of a material of the lens LAj are denoted by NAj, νdAj, and θgFAj, respectively, a focal length of the entire optical system is denoted by f, and a full aperture F-number during focusing on an infinitely distant object is denoted by Fno, and when following relational equations are set:

$$kj = 0.07 (fAj > 0)$$

$$kj = -0.05 (fAj < 0)$$

$$\Delta\theta gFAj = \theta gFAj - (-0.0023 \cdot vdAj + 0.6641)(fAj > 0)$$

$$\Delta\theta gFAj = (-0.0025 \cdot vdAj + 0.6777) - \theta gFAj (fj < 0),$$

following conditions are satisfied:

$$\Sigma |(\Delta\theta gFAj/vdAj) \cdot (f/fAj)/Fno| > 0.001$$

$$-0.3 < f \cdot \{\Sigma kj/(NAj \cdot fAj) + \Sigma 1/(Nni \cdot fni)\} < 0.2.$$

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Figure 1:
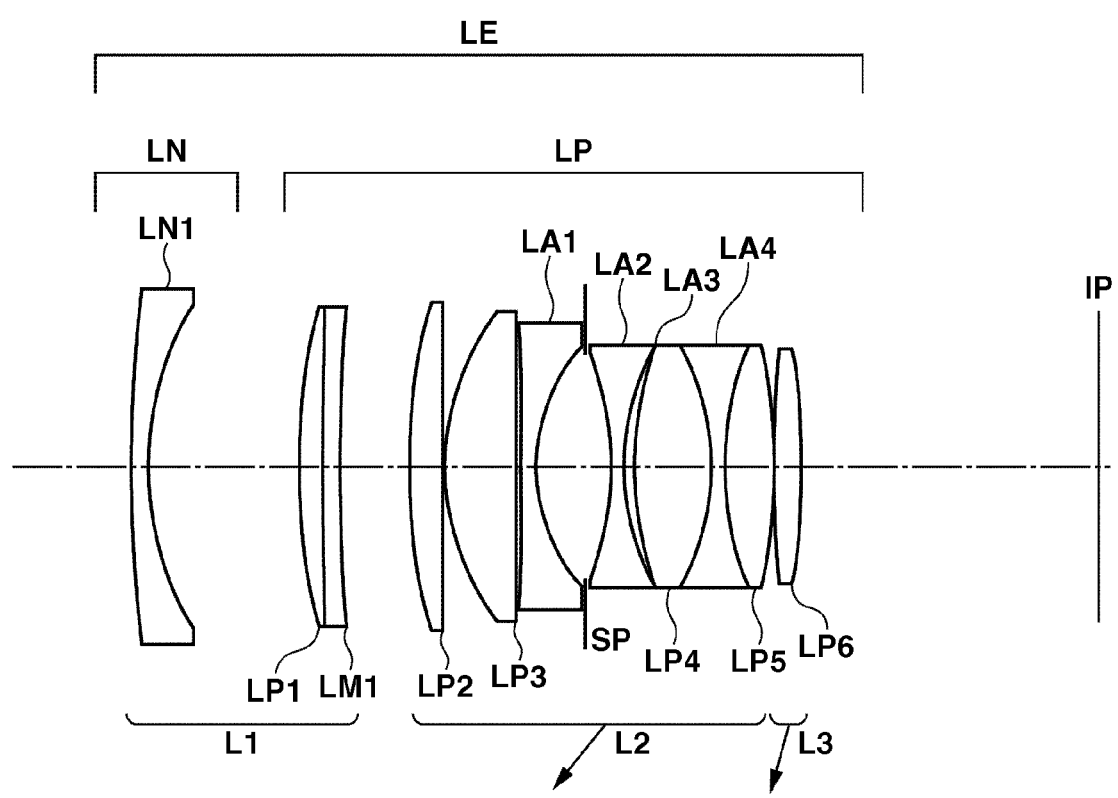
FIG. 1 is a cross-sectional diagram illustrating an optical system during focusing on an infinitely distant object according to a first exemplary embodiment.

Various exemplary embodiments, features, and aspects of the invention will be described in detail below with reference to the drawings.

An optical system according to an exemplary embodiment of the present invention and an optical apparatus including the same will be described. The optical system LE according to the present embodiment is configured to include a negative lens unit LN including one or more negative lenses located closest to the object side and a positive lens unit LP having positive refractive power including a plurality of lenses on the image side of the negative lens unit LN. A portion of the plurality of the lenses constituting the positive lens unit LP is denoted by lenses LAj (j=1, 2, . . . ) in order from the object side. In addition, an anomalous partial dispersion ratio of a material of the lens LAj is denoted by $\Delta\theta gFAj$. In this case, the following condition is satisfied:

$$\Delta\theta gFAj > 0.0025 \quad (1)$$

Herein, the lens LAj is a lens having positive or negative refractive power.

The optical system according to the present embodiment is used for an optical apparatus such as a digital camera, a video camera, a silver-halide film camera, an observation apparatus such as a telescope and a binoculars, a copying machine, and a projector. In the lens cross-sectional diagram, the left side is a front side (object side, enlargement side), and the right side is a rear side (image side, reduction side). In the case where the optical system is used for an image projection apparatus such as a projector, the left side is a screen side, and the right side is a projected image side. LE denotes the optical system. LN denotes the negative lens unit, and LP denotes the positive lens unit. SP denotes an aperture stop (diaphragm) for adjusting a light amount, which is disposed in the positive lens unit LP. IP denotes an image plane. In the case where the optical system is used as a photographic optical system of a video camera or a digital still camera, a photosensitive surface is placed corresponding to a photographic imaging plane of a solid-state image sensor (photoelectric conversion element) such as a CCD sensor or a CMOS sensor for performing photoelectric conversion on an image formed by the optical system.

In each longitudinal aberration diagram, a solid line indicates a meridional light beam of the Fraunhofer d-line; a broken line indicates a sagittal light beam of the d-line; a long-broken line indicates g-line; a dotted dashed line indicates C-line and a two-dotted dashed line indicates F-line. In addition, in each lateral aberration diagram, a solid line indicates d-line; a long-broken line indicates g-line; a dotted dashed line indicates C-line; and a two-dotted dashed line indicates F-line.

In the optical system LE of each exemplary embodiment, the negative lens unit LN includes one or more negative lenses. Herein, the negative lenses are denoted by negative lenses LNi (where i=1, 2, . . . ) in order from the object side. A focal length of the negative lens LNi and a refractive index of a material thereof are denoted by fni and Nni, respectively. A focal length of the lens LAj is dented by fAj. A refractive index, Abbe number, and partial dispersion ratio of a material of the lens LAj are denoted by NAj, vdAj, and θgFAj, respectively. A focal length of the entire optical system is denoted by f, and a full aperture F-number during focusing on an infinitely distant object is denoted by Fno.

In addition, the following relations are set:

$$kj = 0.07 (fAj > 0) \quad (4a)$$

$$kj = -0.05 (fAj < 0) \quad (4b)$$

In addition, the following relations are set:

$$\Delta\theta gFAj = \theta gFAj - (-0.0023 \cdot vdAj + 0.6641)(fAj > 0)(5a)$$

$$\Delta\theta gFAj = (-0.0025 \cdot vdAj + 0.6777) - \theta gFAj (fAj < 0)(5b)$$

In this case, the following conditions are satisfied:

$$\Sigma |(\Delta\theta gFAj/vdAj)\cdot(f/fAj)/Fno| > 0.001 \quad (2)$$

$$-0.3 < f \cdot \{\Sigma kj/(NAj \cdot fAj) + \Sigma 1/(Nni \cdot fni)\} < 0.2 \quad (3)$$

The optical system according to each exemplary embodiment includes a plurality of lenses (optical elements) LAj (j=1, 2, . . . , n) satisfying the condition (1) in order to correct a secondary spectrum of axial chromatic aberration. In addition, the lens LAj satisfies the condition (2). In addition, in order to reduce Petzval sum which is increased in the case of using the lens LAj satisfying the conditions (1) and (2), the negative lens unit LN configured to include one or more negative lenses LNi (i=1, 2, . . . ) is located closest to the object side. The negative lens LNi satisfies the condition (3). The anomalous partial dispersion ratio (anomalous partial dispersion) $\Delta\theta gFAj$ of the material of the lens LAj is defined by the equation (5a) or the equation (5b) when the partial dispersion ratio of g-line and F-line are denoted by θgFAj.

The condition (1) is a formula regulating an anomalous partial dispersion ratio $\Delta\theta gFAj$ of a material of the j-th lens LAj, which is counted from the object side toward the image side. In the case where the lens LAj has positive refractive power (fAj>0), the value is defined by the equation (5a); and in the case where the lens LAj has negative refractive power (fAj<0), the value is defined by the equation (5b). The formula in the parenthesis of the right-hand side of the equation (5a) is a formula obtained by linearly approximating the relationship between a partial dispersion ratio θgF and an Abbe number vd of a lanthanum flint glass illustrated in FIG. 15A. Therefore, a value of the left-hand side of the equation (5a) indicates a difference between a partial dispersion ratio θgFAj of a lanthanum flint glass having the same Abbe number vdAj as the lens LAj and a partial dispersion ratio θgFAj of the lens LAj.

Herein, the Abbe number vd and the partial dispersion ratio θgF are defined by the following equations when refractive indexes of d-line, g-line, C-line, and F-line are denoted by nd, ng, nC, and nF, respectively.

$$vd = (nd-1)/(nF-nC) \quad (15)$$

$$\theta gF = (ng-nF)/(nF-nC) \quad (16)$$

Figure 15A:
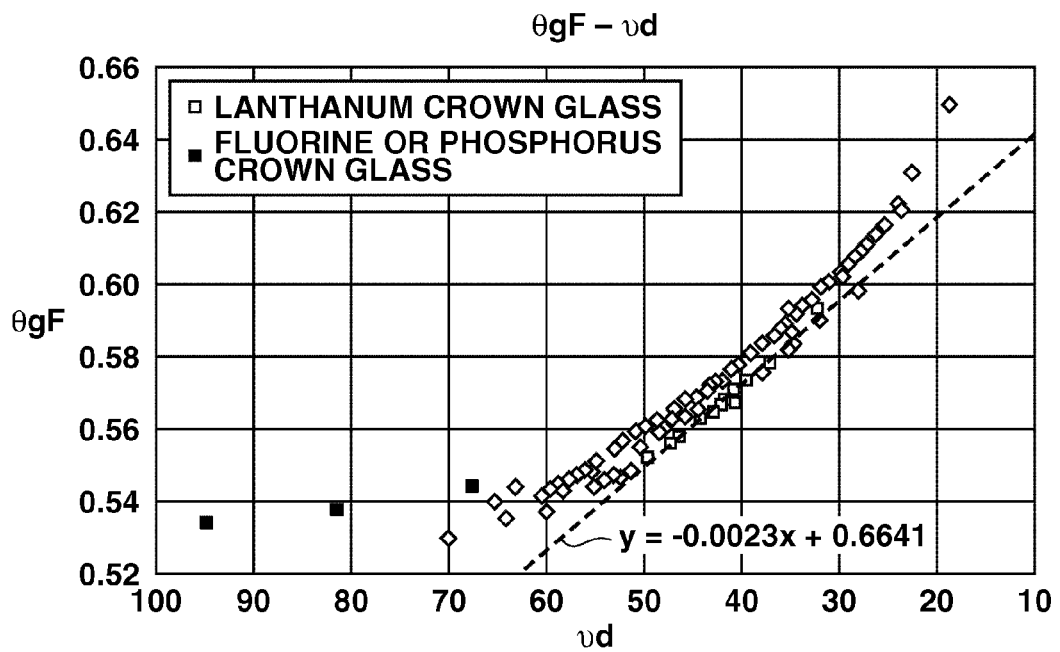
FIGS. 15A and 15B are diagrams illustrating a characteristic distribution of θgF–vd of a general glass material.
Figure 15B:
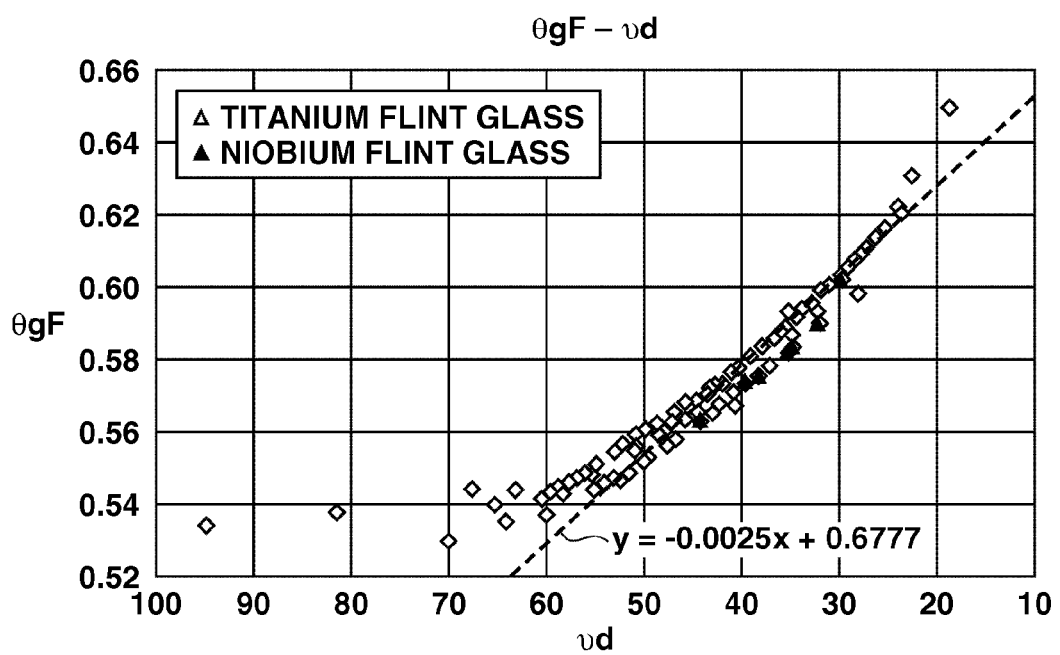

On the other hand, the formula in the parenthesis of the right-hand side of the equation (5b) is a formula obtained by linearly approximating the relationship between the partial dispersion ratio θgF and Abbe number vd of the titanium flint glass illustrated in FIG. 15B. Therefore, the value of the left-hand side of the equation (5b) represents a difference between the partial dispersion ratio θgFAj of the titanium flint glass having the same Abbe number vdAj as that of the lens LAj and the partial dispersion ratio θgFAj of the lens LAj.

In general, in a large-aperture-ratio Gauss lens, in order to achieve high optical performance in a range from on the axis up to the margin of the image plane, a lanthanum flint glass is used for the positive lenses, and a titanium flint glass is used for the negative lenses. However, as illustrated in FIG. 15A, the partial dispersion ratio of the lanthanum flint glass is smaller than that of other glasses having the same Abbe number. Therefore, if the lanthanum flint glass is used for the positive lenses, the secondary spectrum of axial chromatic aberration is increased, In addition, as illustrated in FIG. 15B, the partial dispersion ratio of the titanium flint glass is larger than those of other glasses having the same Abbe number. Therefore, if the titanium flint glass is used for the negative lenses, the secondary spectrum of axial chromatic aberration is increased. Accordingly, the configuration that at least one or more lenses LAj satisfying the condition (1) are included is the necessary condition for preventing an increase in the secondary spectrum of axial chromatic aberration.

As a material of the lens LAj satisfying the condition (1), in the case using the positive lenses, there are a fluorine crown glass containing fluorine and a phosphorus crown glass containing phosphorus as illustrated FIG. 15A. In the case using the negative lenses, there is a niobium flint glass containing niobium as illustrated in FIG. 15B.

In addition, the lens LAj can be provided with such a refractive power that the condition (2) can be satisfied. Therefore, the secondary spectrum of axial chromatic aberration can be sufficiently corrected, so that it is possible to efficiently reduce color flare caused by the secondary spectrum of axial chromatic aberration.

Hereinafter, the condition (2) will be described. If the correction amount of axial chromatic aberration coefficient with respect to g-line and F-line due to the use of the lenses LAj is denoted by $\Delta LgFj$, the following relational equation is satisfied:

$$\Delta LgFj = \Delta\theta gFj/(vdj \cdot fj) \cdot hj^2 \quad (17)$$

Herein, hj denotes an incidence height of a paraxial light beam incident to a lens surface. In addition, If the correction amount of axial chromatic aberration with respect to g-line and F-line due to the use of the lenses LAj is denoted by $\Delta xj$, the following relational equation is satisfied:

$$\Delta xj = -f \cdot \Delta LgFj \quad (18)$$

In addition, if a correction amount of axial lateral aberration with respect to g-line and F-line due to the use of the lens LAj is denoted by $\Delta yj$, the following relational equation is satisfied under the condition that spherical aberration is sufficiently corrected:

$$\Delta yj = \Delta xj/(2 \cdot Fno) \quad (19)$$

Therefore, the following equation is obtained from the equations (17), (18), and (19):

$$(\Delta\theta gFj/vdj) \cdot (f/fj)/Fno = -2\Delta yj/hj^2 \quad (20)$$

The condition (2) is a formula obtained by extending the equation (20) to the case where there are a plurality of the lenses LAj and appropriately regulating the value in the right-hand side thereof so as to efficiently correct color flare. Therefore, if the conditions (1) and (2) are satisfied, it is possible to efficiently correct color flare caused by the secondary spectrum of axial chromatic aberration. However, if an optical material is selected so as to satisfy the conditions (1) and (2), the image plane is particularly slanted toward the object side, so that the optical performance in a range from on the axis up to the margin of the image plane tends to be decreased.

Figure 14A:
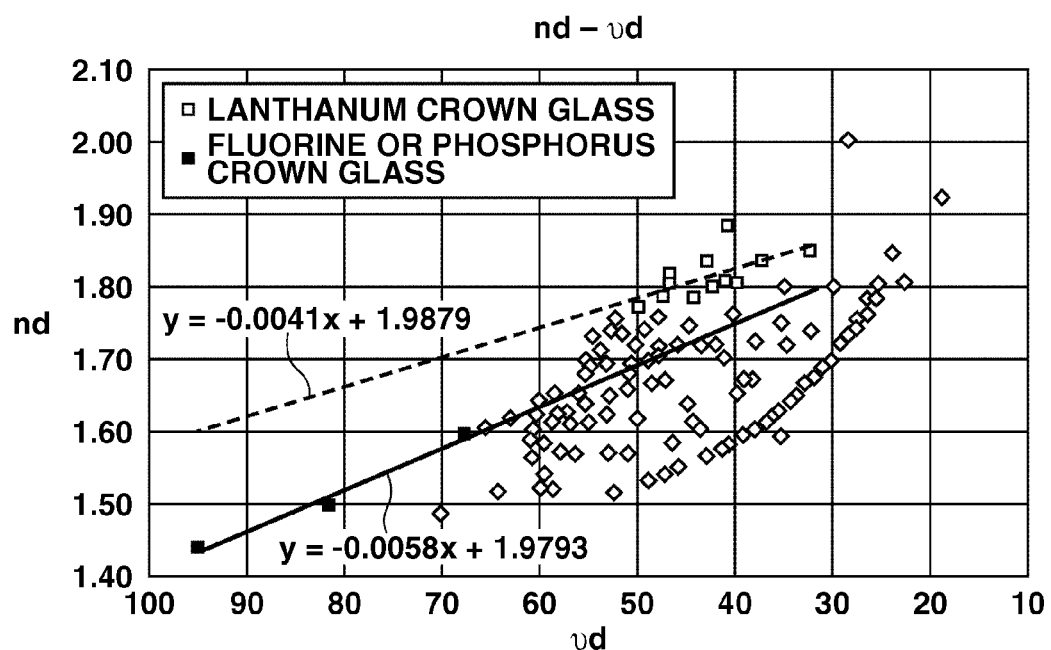
FIGS. 14A and 14B are diagrams illustrating a characteristic distribution of nd–vd of a general glass material.

The reason is described hereinafter. As illustrated in FIG. 14A, a lanthanum flint glass used for a positive lens of the general large-diameter Gauss lens has a high refractive index, and a fluorine crown glass and a phosphorus crown glass satisfying the condition (1) have lower refractive indexes. Therefore, if the lens LAj having positive refractive power satisfying the condition (1) is used, the Petzval sum is increased, so that the image plane is slanted toward the object side.

Figure 14B:
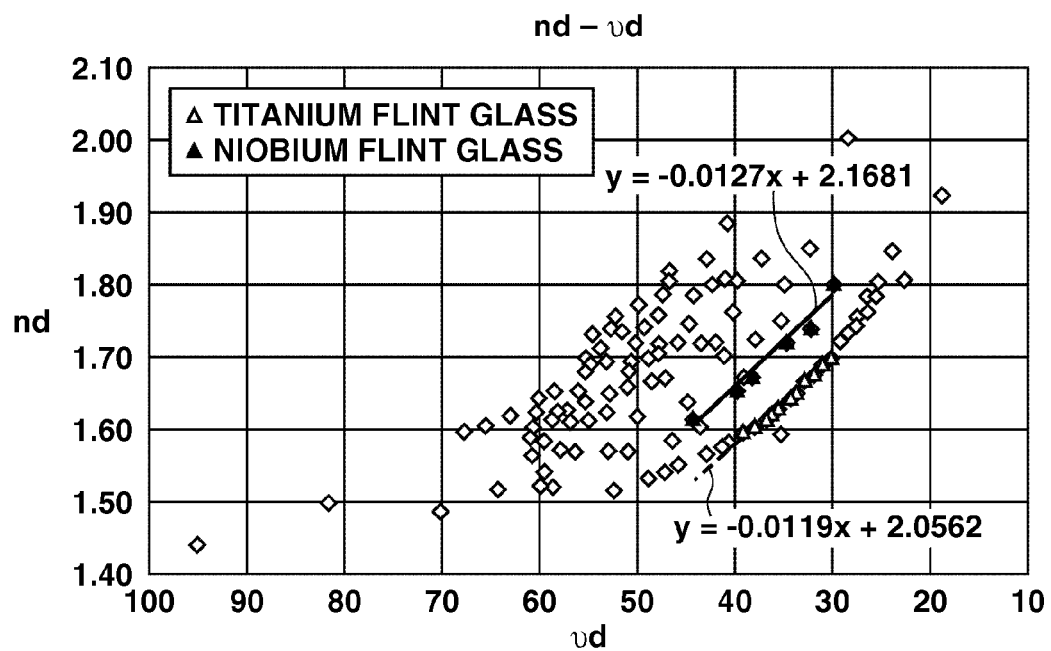

In addition, as illustrated in FIG. 14B, a titanium flint glass used for a negative lens of a general large-diameter Gauss lens has a low refractive index, and a niobium flint glass satisfying the condition (1) has a higher refractive index. Therefore, if the lens LAj having negative refractive power satisfying the condition (1) is used, the Petzval sum is increased, so that the image plane is slanted toward the object side. In other words, if an optical material of the lens LAj is selected so as to satisfy the condition (1) regardless of the positive lens and the negative lens, the image plane is slanted toward the object side, so that it is difficult to achieve high optical performance in a range from on the axis up to the margin of the image plane.

Therefore, in the present embodiment, a negative lens unit LN including only at least one or more negative lenses, which are counted from the most object side, is disposed. In addition, the negative lenses LNi constituting the negative lens unit LN satisfy the conditions (3), (4a), and (4b).

Hereinafter, the condition (3) will be described. In a general large-diameter Gauss lens, with respect to the optical material of the positive lens, the lanthanum crown glass is replaced with a fluorine crown glass or a phosphorus crown glass satisfying the condition (1). Alternatively, with respect to the optical material of the negative lens, the titanium flint glass is replaced with a niobium flint glass satisfying the condition (1). In this case, an amount of change in Petzval sum is considered. During the replacement of the optical material, the condition is added that the material having the same Abbe number is selected so that first-order axial chromatic aberration is not changed. Therefore, although the optical material is replaced, the refractive power of the lens LAj is not changed.

Therefore, an amount of change in Petzval sum $\Delta Psumj$ according to the replacement of the optical material is expressed by the following formula:

$$\Delta Psumj = 1/(nj \cdot fj) - 1/(n \cdot f) = kj/(nj \cdot fj) \quad (21)$$

$$kj = (n - nj)/n \quad (22)$$

Herein, f and n denote a focal length and refractive index of the optical material before the replacement, respectively, and kj denotes a rate of change in refractive index caused by the replacement of the optical material. The equation (4a) expresses the value of kj in the case where the lens LAj has positive refractive power, that is, in the case where a lanthanum crown glass is replaced with a fluorine crown glass or a phosphorus crown glass.

Next, the basis for the value of the equation (4a) will be described. First, as illustrated in FIG. 14A, a formula is obtained by linearly approximating the relationship between the Abbe number and refractive index of the lanthanum crown glass, and a formula is obtained by linearly approximating the relationship between the Abbe number and refractive index of each of the fluorine crown glass and the phosphorus crown glass. The value in the right-hand side of the equation (4a) is obtained by calculating the values of the equation (22) with the Abbe number being in a range of from 30 to 95 by using the aforementioned linearly approximated equation and taking the average thereof. In other words, the value represents a rate of change in average refractive index in the case where the lanthanum crown glass is replaced with each of a fluorine crown glass and a phosphorus crown glass.

The equation (4b) expresses the value of Kj in the case where the refractive power of the lens LAj is negative, that is, in the case where the titanium flint glass is replaced with a niobium flint glass. The value of the right-hand side of the equation (4b) is a value obtained similarly to the case of the equation (4a), and the value represents a ratio of change in average refractive index in the case where the titanium flint glass is replaced with a niobium flint glass.

Therefore, according to the equations (21) and (22), a rate of change in Petzval sum can be estimated by using the lenses LAj satisfying the condition (1). With respect to the value, in the case where fAj>0, since kj>0, $\Delta$Psumj>0; and in the case where fAj<0, kj<0, so that $\Delta$Psumj>0. Therefore, in either case, the Petzval sum is increased.

In the present embodiment, in order to correct such a change in Petzval sum, a negative lens unit LN configured to include one or more negative lenses is located closest to the object side.

When the negative lenses constituting the negative lens unit LN are denoted by negative lenses LNi counted from the object side, a correction amount $\Delta$Psumi of Petzval sum due to the negative lens LNi can be expressed by the following equation:

$$\Delta Psumi = 1/(Nni \cdot fni) \quad (23)$$

Herein, fni and Nni denote a focal length of the negative lens LNi and a refractive index of a material thereof, respectively.

Therefore, a difference in Petzval sum between a general large-diameter Gauss lens and the optical system according to the present embodiment can be expressed by the following equation using the equations (21) and (23):

$$\Delta Psumj + \Delta Psumi = kj/(nAj \cdot fAj) + 1/(Nni \cdot fni) \quad (24)$$

The condition (3) is a formula obtained by extending the equation (24) to the case where there are a plurality of the lens LAj and a plurality of the negative lenses LNi, standardizing with the focal length f of the optical system, and regulating the upper and lower limit values. If the value is larger than the upper limit value, the Petzval sum due to the negative lenses LNi is insufficiently corrected, so that it is difficult to achieve high optical performance in a range from on the axis up to the margin of the image plane.

On the other hand, if the value is smaller than the lower limit value, the refractive power of the negative lens unit LNi is greatly increased, and thus, the Petzval sum is overly corrected, which is not desirable. In addition, if the refractive power of the negative lens LNi is increased, the axial light beam is allowed to greatly diverge by the negative lens unit LNi, and thus, the diameter of the positive lens subsequent to the negative lens unit LNi is increased, which is not desirable. Due to the increase in diameter of the positive lens subsequent to the negative lens unit LNi, it is difficult to correct the aberration of the axial light beam, which is not desirable in terms of optical performance. Therefore, if the conditions (1), (2), and (3) are satisfied, color flare can be reduced, and the high optical performance in a range from on the axis up to the margin of the image plane can be achieved.

In addition, in the description of the conditions (1), (2), and (3), a fluorine crown glass, a phosphorus crown glass, and a niobium flint glass are exemplified as optical materials of the lenses LAj. However, if the conditions (1), (2), and (3) are satisfied, the present invention is not limited thereto. In addition, if the numerical range of the condition (1) is set to the following range, it is possible to obtain much higher effect of the present embodiment.

$$\Delta \theta gFAj > 0.005 \quad (1a)$$

More desirably, the numerical range of the condition (1a) may be set to the following range:

$$\Delta \theta gFAj > 0.010 \quad (1b)$$

Figure 16A:
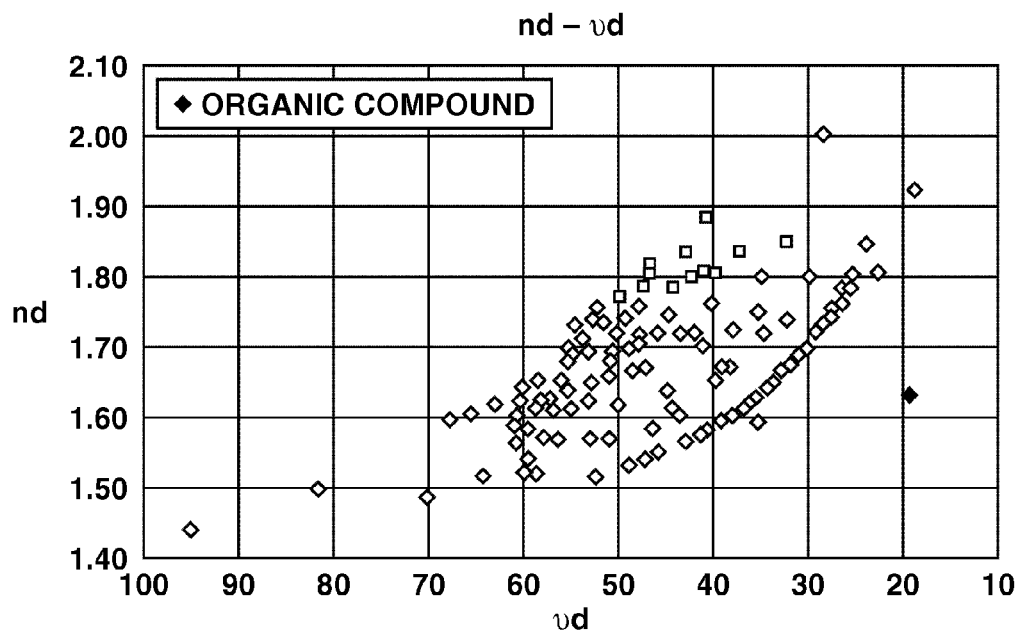
FIGS. 16A and 16B are diagrams illustrating optical characteristics of a resin material satisfying a condition (1) according to an exemplary embodiment of the present invention.
Figure 16B:
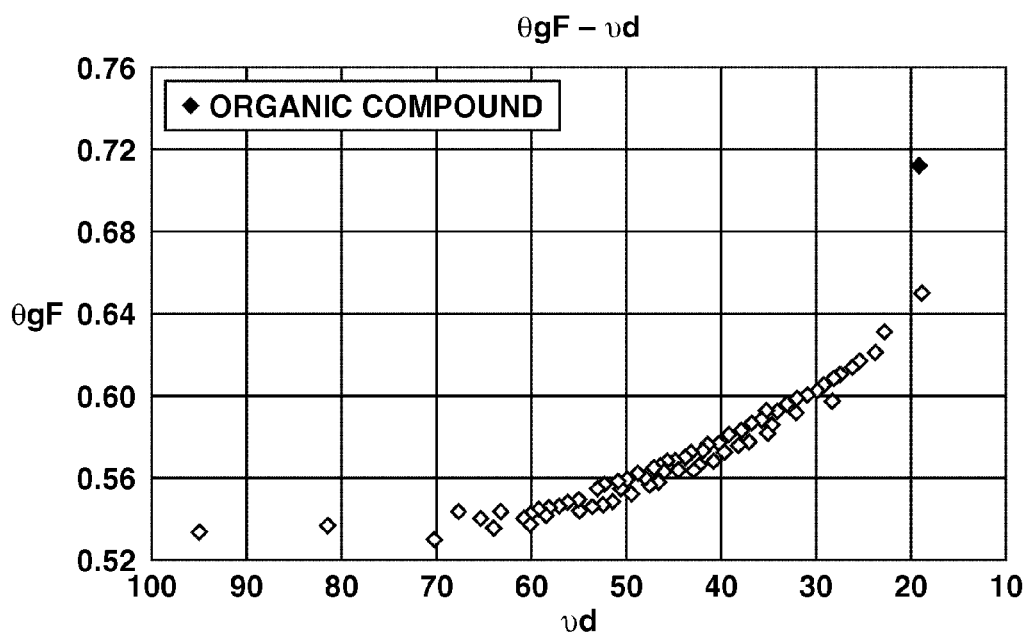

As a material satisfying the condition (1b), there is an organic compound having the optical properties illustrated in FIG. 16.

In this manner, according to each exemplary embodiment, it is possible to obtain an optical system which sufficiently corrects the secondary spectrum of axial chromatic aberration so as to reduce color flare and has high optical performance in a range from on the axis up to the margin of the image plane.

In the present embodiment, it is more desirable that one or more of the following conditions be satisfied. An Abbe number of a material of the negative lens LNi constituting the negative lens unit LN is denoted by vdni. A refractive index and Abbe number of a material of one positive lens LPp among the positive lenses LPi constituting the positive lens unit LP excluding the lens LAj are denoted by NLPp and vdLPp, respectively.

A refractive index and Abbe number of a material of one negative lens LMn among the negative lenses LMi excluding the Lenses LAj constituting the positive lens unit LP and the negative lenses LNi constituting the negative lens unit LN are denoted by NLMn and vdLMn, respectively. A distance on the optical axis from a most image-side lens surface to an image-side focus (image point) is denoted by Bf. In the case where the optical system according to the present embodiment is used for an optical apparatus including a solid-state image sensor, a photographic angle of view of the optical system is denoted by 2$\omega$ (degrees). In this case, it is desirable that one or more of the following conditions be satisfied:

$$Nni < 1.65 \quad (6)$$

$$vdni > 50 \quad (7)$$

$$NLPp > 1.70 \quad (8)$$

$$vdLPp > 30 \quad (9)$$

$$NLMn < 1.75 \quad (10)$$

$$vdLMn < 40 \quad (11)$$

$$0.9 < Fno < 2.0 \quad (12)$$

$$Bf/f < 1 \quad (13)$$

$$30(degrees) < 2\omega < 56(degrees) \quad (14)$$

As expressed in the conditions (6) and (7), if the materials of the negative lens LNi constituting the negative lens unit LN are appropriately set, it is possible to efficiently correct the slanting of the image plane toward the object side.

As expressed in the conditions (8) and (9), if the material of one positive lens LPp excluding the lenses LAj is appropriately set, it is possible to obtain high optical performance in a range from on the axis up to the margin of the image plane. As expressed in the conditions (10) and (11), if the material of one negative lens LMn among the negative lenses LMi excluding the lenses LAj and the negative lenses LNi, it is possible to obtain high optical performance in a range from on the axis up to the margin of the image plane. As expressed in the condition (12), if the F-number of the optical system during focusing on an infinitely distant object is set, it is possible to most effectively obtain high optical performance.

As expressed in the condition (13), if the distance on the optical axis from the most image-side lens surface to the image-side focal point is set, it is possible to most effectively obtain high optical performance. As expressed in the condition (14), if the photographic angle of view 2ω in the case where the optical system according to the present embodiment is used for an optical apparatus is set, it is possible to most effectively obtain high optical performance.

The optical system according to each exemplary embodiment includes an aperture stop SP between the lenses. In addition, a lens system located on the object side of the aperture stop SP and a lens system located on the image side of the aperture stop SP have positive refractive power, and the lens surfaces on the object side and the image side facing the aperture stop SP have a concave shape.

Accordingly, coma and sagittal flare can be efficiently corrected. In addition, it is desirable that the optical system according to each exemplary embodiment include one or more aspheric surfaces. Accordingly, it is possible to easily efficiently correct spherical aberration and coma.

Next, the detailed configuration of each exemplary embodiment will be described. The optical system according to each of the first to sixth exemplary embodiments is a large-diameter standard lens having a focal length in a range from 45 mm to 60 mm and an aperture ratio in a range from 1.25 to 1.85. In each exemplary embodiment, the optical system includes a negative lens LNi located closest to the object side and lenses (optical element) LAj made of a material satisfying the condition (1) of the optical system. The optical system according to each exemplary embodiment satisfies the aforementioned configuration conditions, so that it is possible to sufficiently reduce color flare and to obtain high optical performance in a range from on the axis up to the margin of the image plane. Hereinafter, features of each exemplary embodiment will be described.

In the first exemplary embodiment illustrated in FIG. 1, a large-aperture-ratio standard photographic optical system is configured to have a focal length of 51.7 mm, an aperture ratio of 1.45, a photographic angle of view of 45.4 degrees. The photographic optical system is configured to include a negative lens LN1 located closest to the object side and four optical elements LA1, LA2, LA3, and LA4 satisfying the condition (1).

Figure 2:
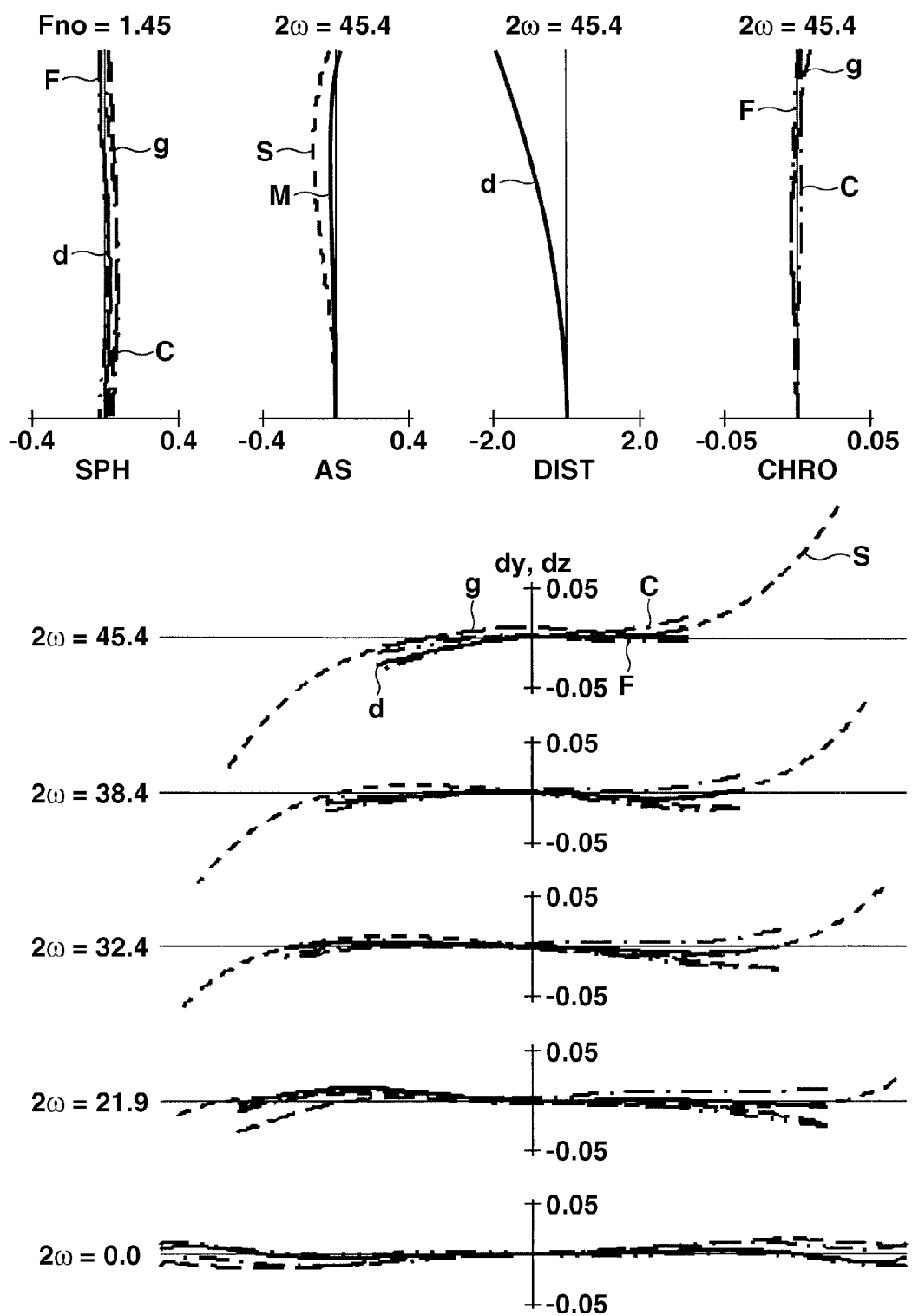
FIG. 2 is an aberration diagram during focusing on an infinitely distant object according to the first exemplary embodiment.

FIG. 2 is an aberration diagram during focusing on an infinitely distant object according to the first exemplary embodiment. In the first exemplary embodiment, the photographic optical system has a floating mechanism. When the lens units are divided during focusing as illustrated in FIG. 1, the first lens unit L1 is configured to be fixed, and as the object distance is changed from the infinite distance to a near distance, the second lens unit L2 and the third lens unit L3 are configured to be moved from the image side toward the object side with different movement amounts. Accordingly, a change in spherical aberration and coma due to focusing is reduced.

Figure 3:
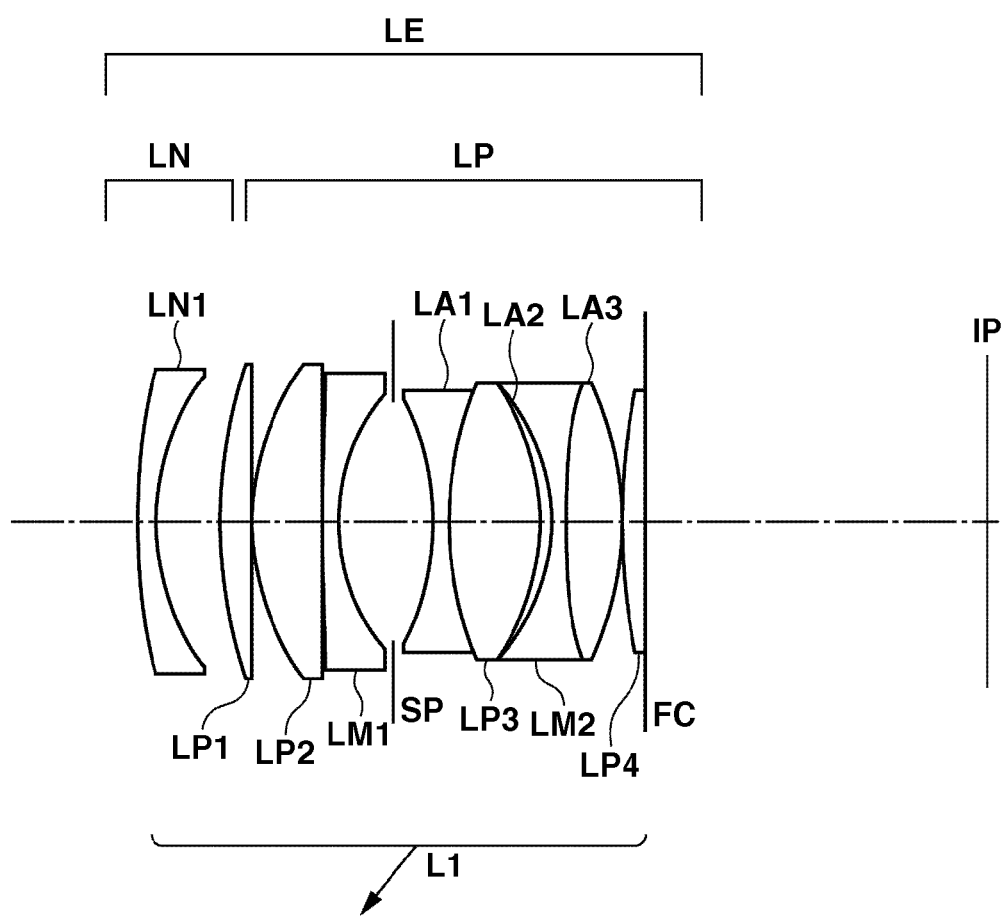
FIG. 3 is a cross-sectional diagram illustrating an optical system during focusing on an infinitely distant object according to a second exemplary embodiment.

In a second exemplary embodiment illustrated in FIG. 3, a large-aperture-ratio standard photographic optical system is configured to have a focal length of 51.7 mm, an aperture ratio of 1.45, and a photographic angle of view of 45.4 degrees. The photographic optical system is configured to include a negative lens LN1 located closest to the object side and three optical elements LA1, LA2, and LA3 satisfying the condition (1).

Figure 4:
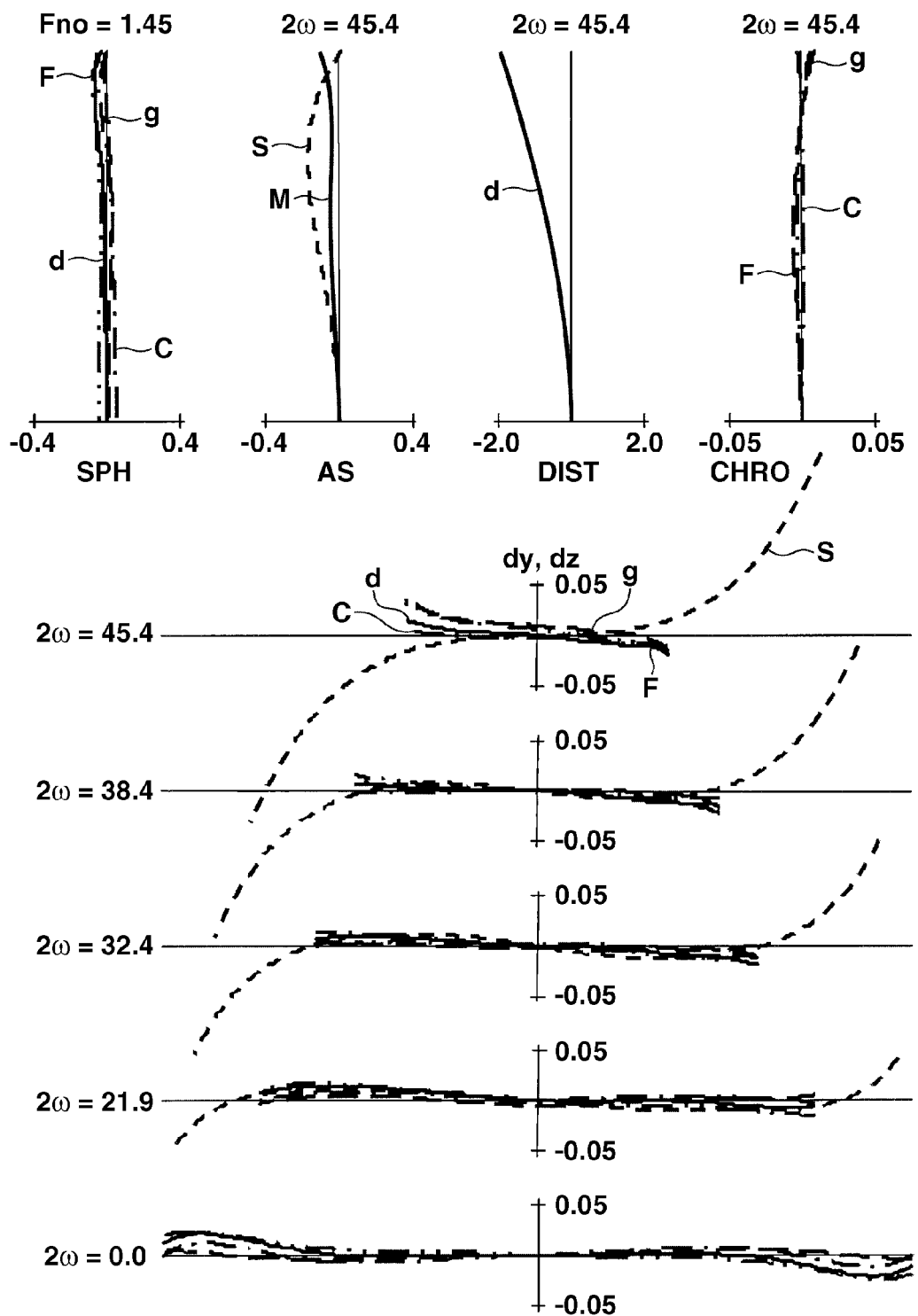
FIG. 4 is an aberration diagram during focusing on an infinitely distant object according to the second exemplary embodiment.

FIG. 4 is an aberration diagram during focusing on an infinitely distant object according to the second exemplary embodiment. In the photographic optical system according to the second exemplary embodiment, the focusing is an entire-optical-system moving type where a flare cut stop FC remains and the first lens unit L1 is moved during focusing. As the object distance is changed from the infinite distance to a near distance, the first lens unit L1 is moved from the image side toward the object side. Chromatic aberration due to focusing is reduced, and the size of the entire photographic optical system becomes compact in comparison with the photographic optical system according to the first exemplary embodiment.

Figure 5:
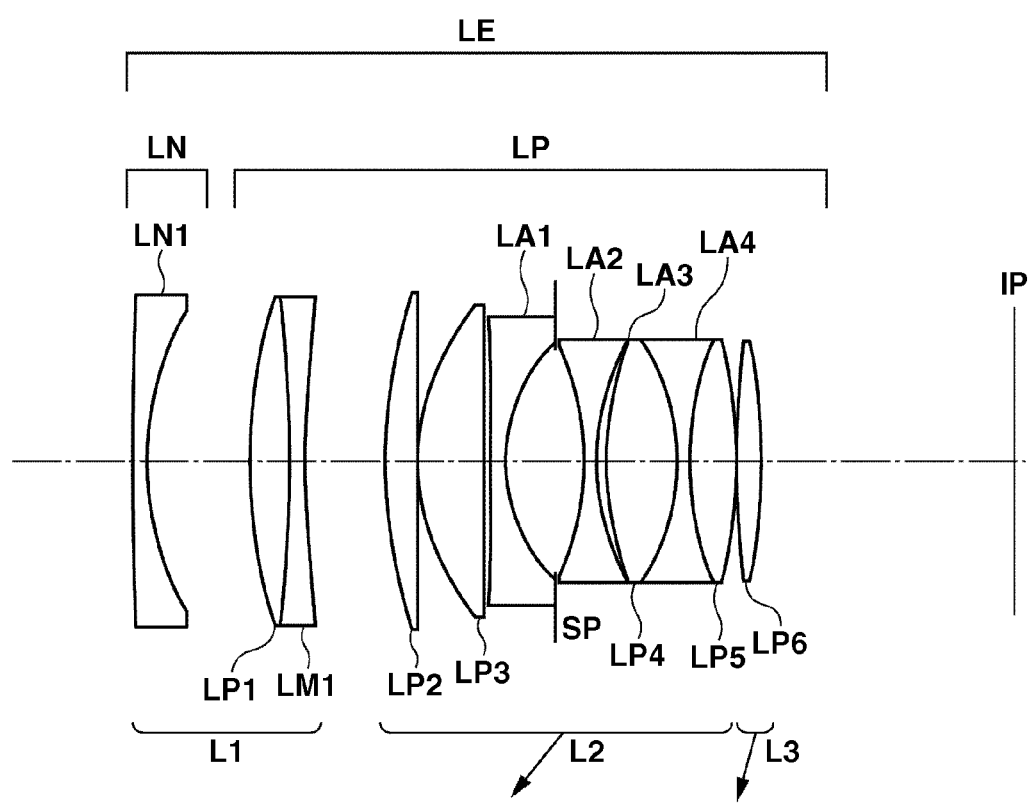
FIG. 5 is a cross-sectional diagram illustrating an optical system during focusing on an infinitely distant object according to a third exemplary embodiment.

In a third exemplary embodiment illustrated in FIG. 5, a large-aperture-ratio standard photographic optical system is configured to have a focal length of 51.7 mm, an aperture ratio of 1.25, and a photographic angle of view of 45.4 degrees. The photographic optical system is configured to include a negative lens LN1 located closest to the object side and four optical elements LA1, LA2, LA3, and LA4 satisfying the condition (1).

Figure 6:
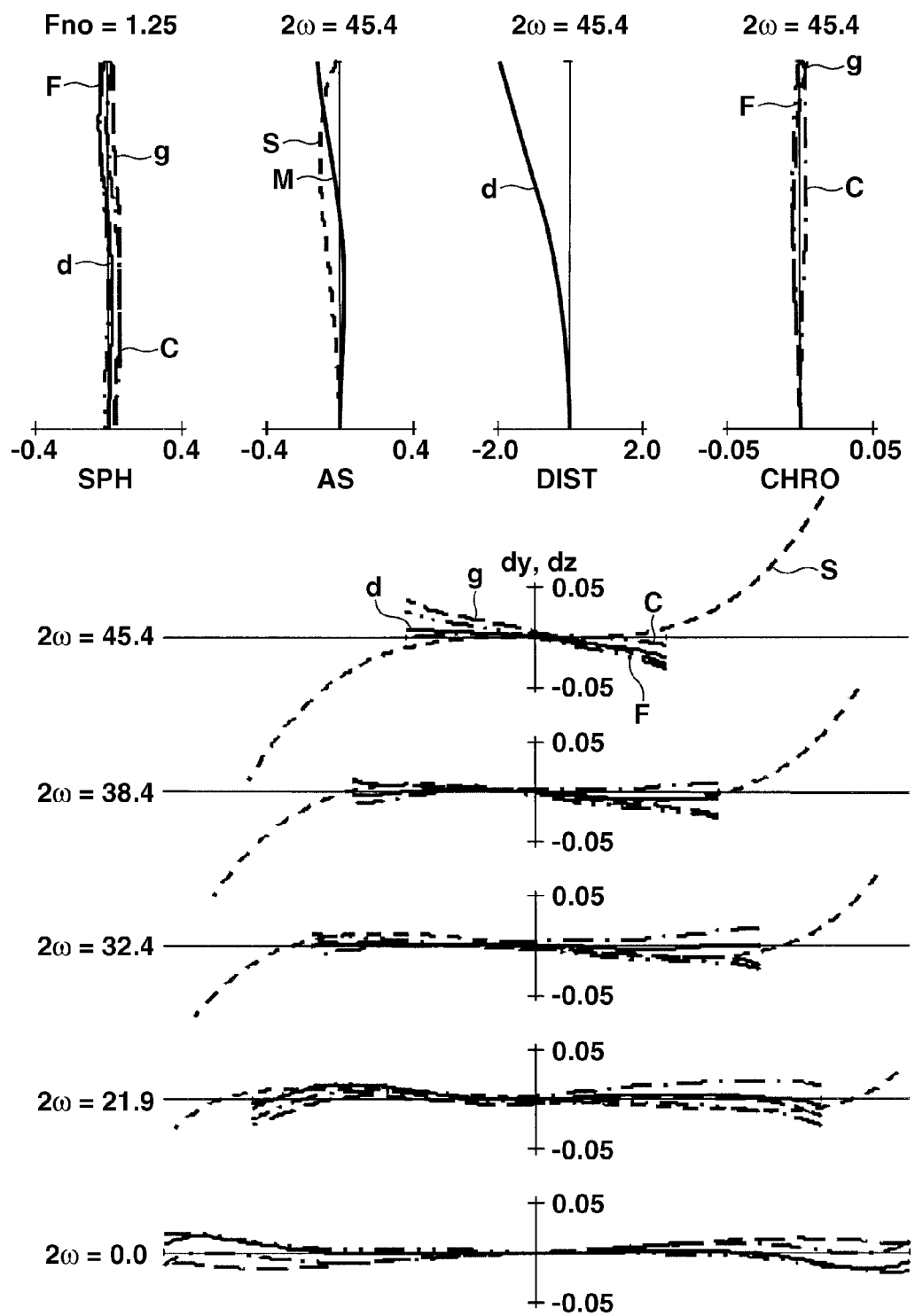
FIG. 6 is an aberration diagram during focusing on an infinitely distant object according to the third exemplary embodiment.

FIG. 6 is an aberration diagram during focusing on an infinitely distant object according to the third exemplary embodiment. In the third exemplary embodiment, the same floating mechanism as that of the first exemplary embodiment is employed, so that a change in spherical aberration and coma due to focusing is reduced.

Figure 7:
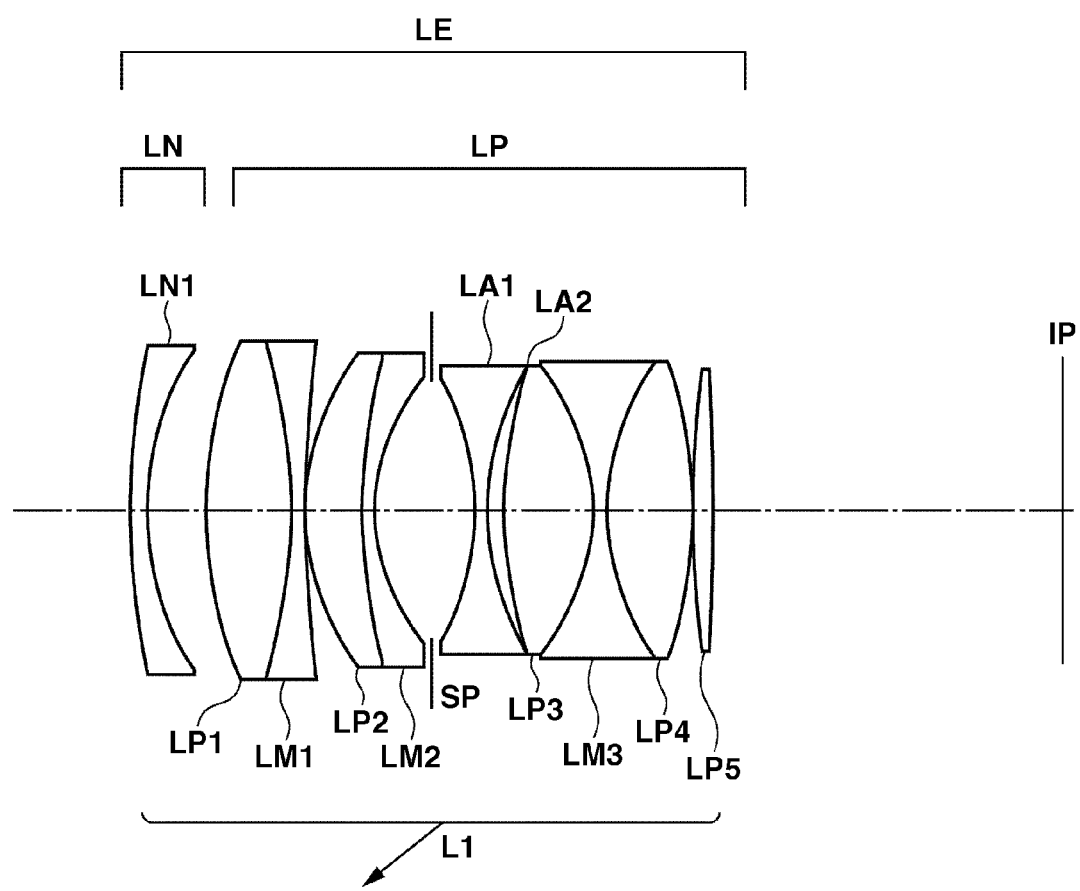
FIG. 7 is a cross-sectional diagram illustrating an optical system during focusing on an infinitely distant object according to a fourth exemplary embodiment.

In a fourth exemplary embodiment illustrated in FIG. 7, a large-aperture-ratio standard photographic optical system is configured to have a focal length of 51.7 mm, an aperture ratio of 1.25, and a photographic angle of view of 45.4 degrees. The photographic optical system is configured to include a negative lens LN1 located closest to the object side and two optical elements LA1 and LA2 satisfying the condition (1).

Figure 8:
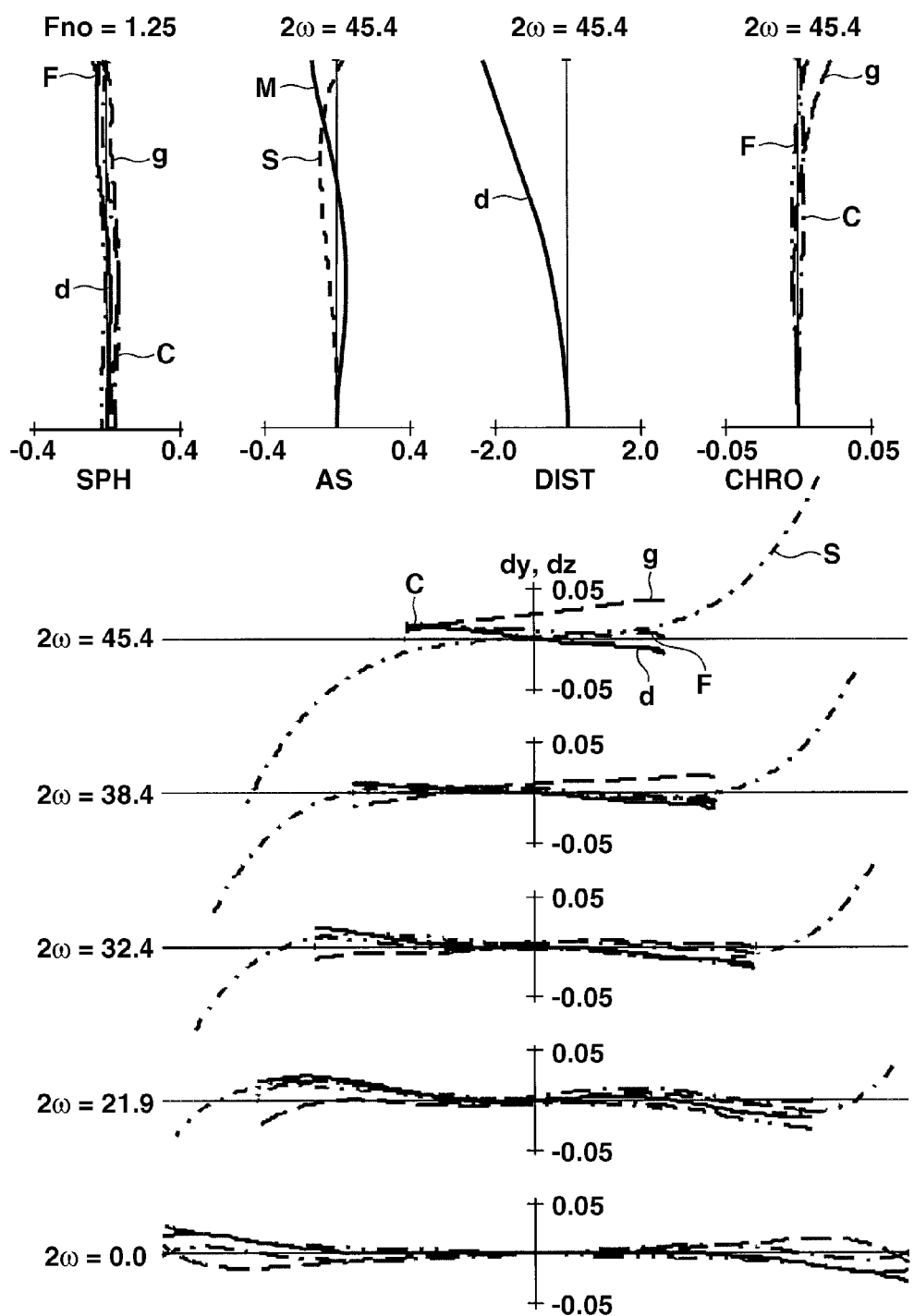
FIG. 8 is an aberration diagram during focusing on an infinitely distant object according to the fourth exemplary embodiment.

FIG. 8 is an aberration diagram during focusing on an infinitely distant object according to the fourth exemplary embodiment. In the fourth exemplary embodiment, the focusing is an entire-optical-system moving type, and the entire optical system is compact and has high optical performance.

Figure 9:
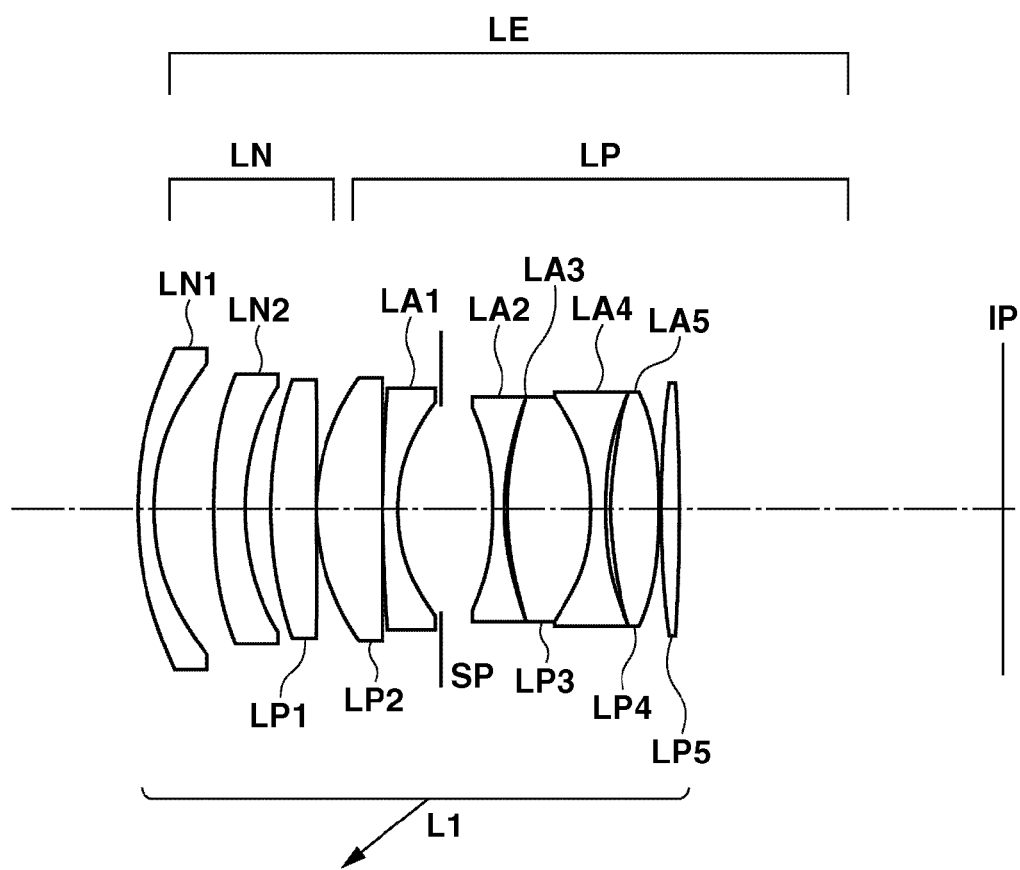
FIG. 9 is a cross-sectional diagram illustrating an optical system during focusing on an infinitely distant object according to a fifth exemplary embodiment.
Figure 10:
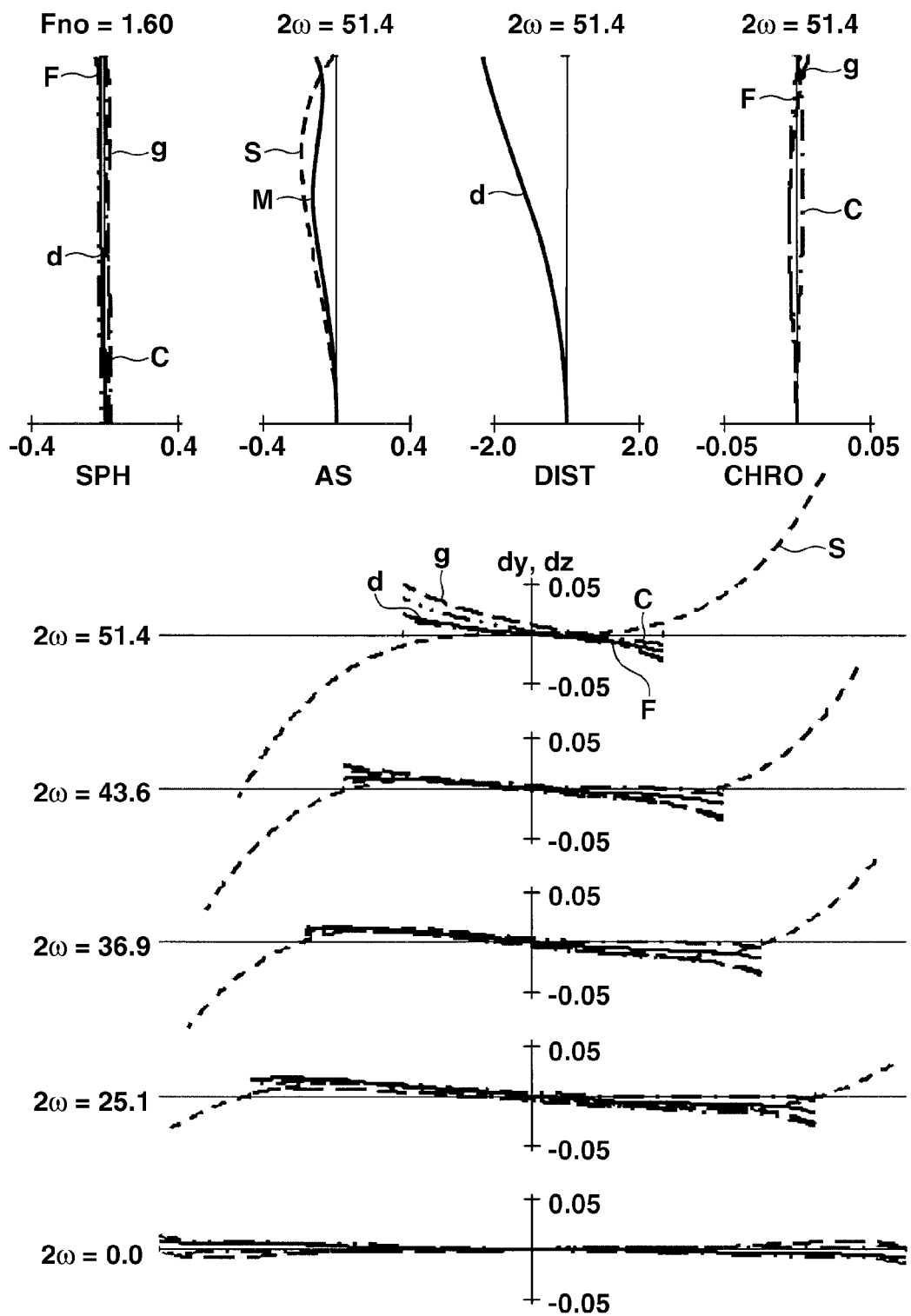
FIG. 10 is an aberration diagram during focusing on an infinitely distant object according to the fifth exemplary embodiment.

In a fifth exemplary embodiment illustrated in FIG. 9, a large-aperture-ratio standard photographic optical system is configured to have a focal length of 45 mm, an aperture ratio of 1.60, and a photographic angle of view of 54.4 degrees. The negative lens unit LN is configured to include two negative lenses LN1 and LN2. The optical system is configured to include five optical elements LA1, LA2, LA3, LA4, and LA5 satisfying the condition (1). FIG. 10 is an aberration diagram during focusing on an infinitely distant object according to the fifth exemplary embodiment. In the fifth exemplary embodiment, the focusing is an entire-optical-system moving type.

Figure 11:
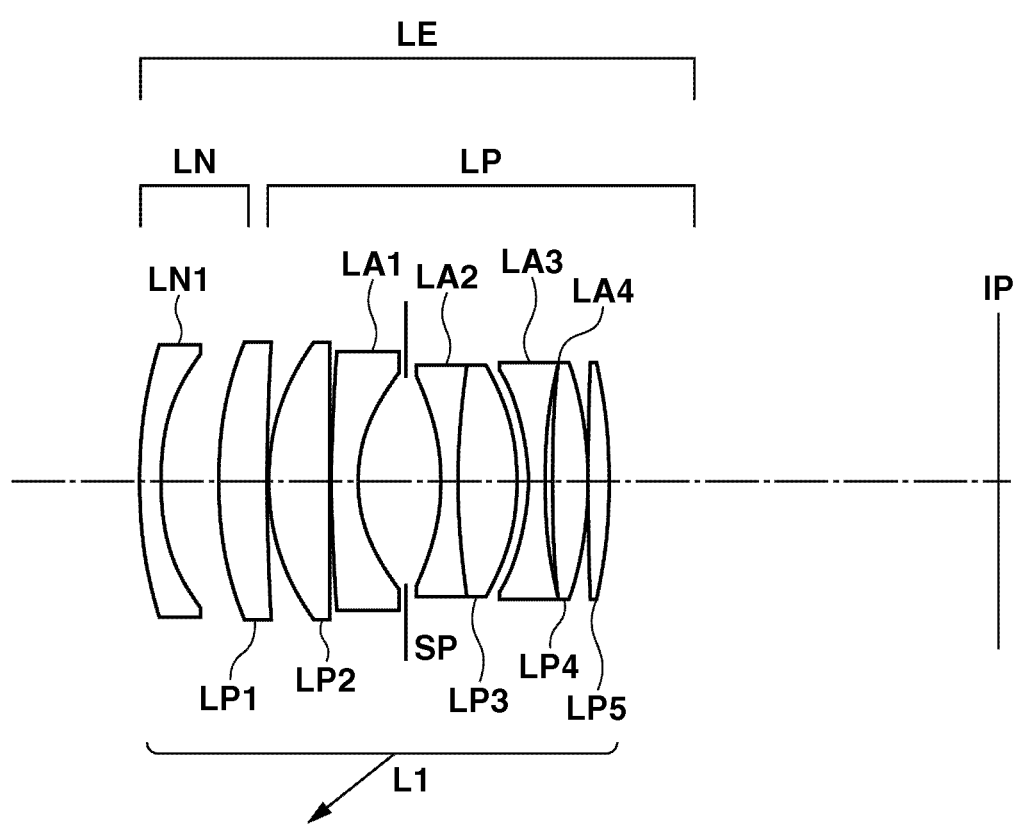
FIG. 11 is a cross-sectional diagram illustrating an optical system during focusing on an infinitely distant object according to a sixth exemplary embodiment.
Figure 12:
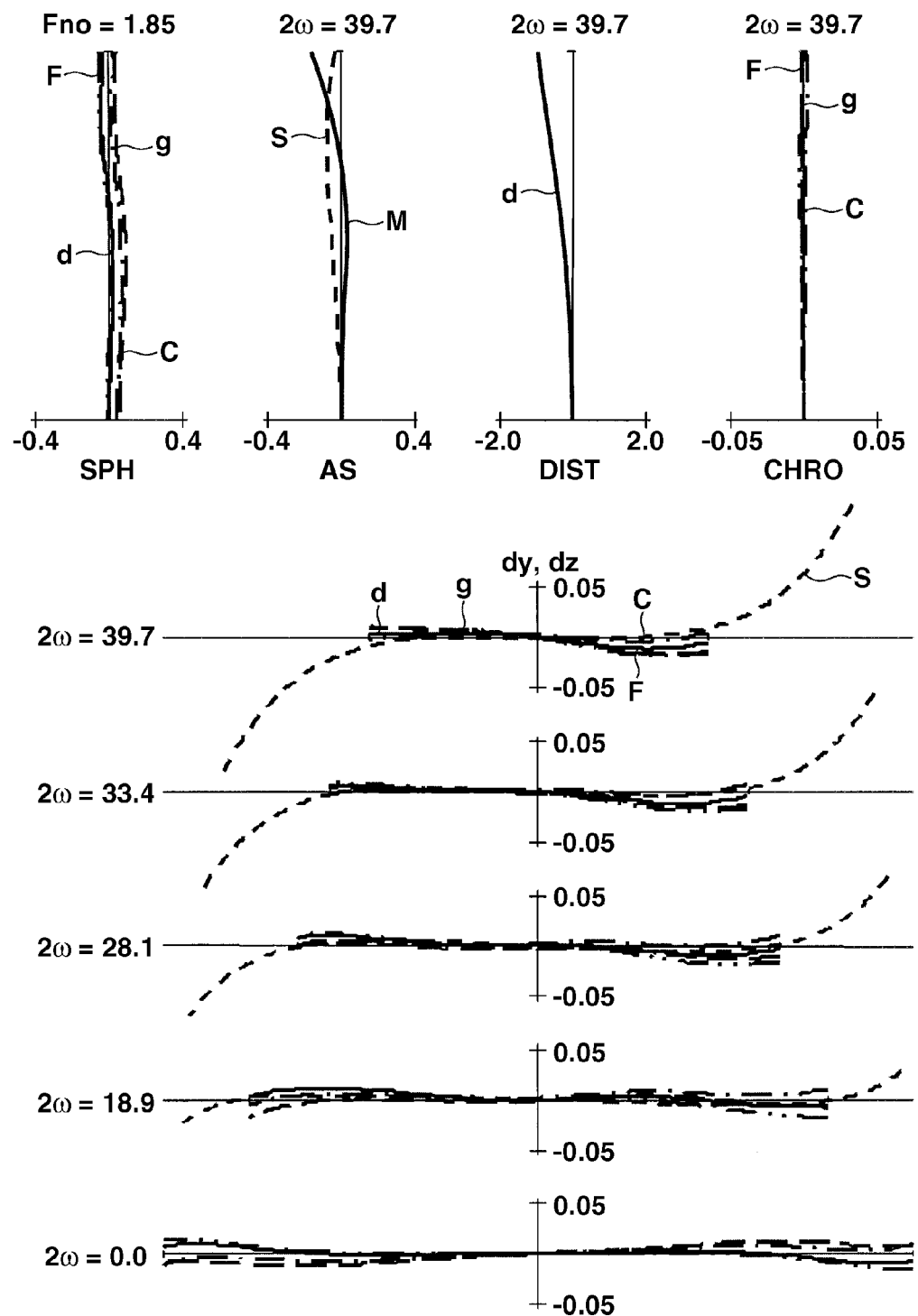
FIG. 12 is an aberration diagram during focusing on an infinitely distant object according to the sixth exemplary embodiment.

In a sixth exemplary embodiment illustrated in FIG. 11, a large-aperture-ratio standard photographic optical system is configured to have a focal length of 60 mm, an aperture ratio of 1.85, and a photographic angle of view of 39.7 degrees. The photographic optical system is configured to include a negative lens LN1 located closest to the object side thereof and four optical elements LA1, LA2, LA3, and LA4 satisfying the condition (1). FIG. 12 is an aberration diagram during focusing on an infinitely distant object according to the sixth exemplary embodiment. In the sixth exemplary embodiment, the focusing is an entire-optical-system moving type.

Figure 13:
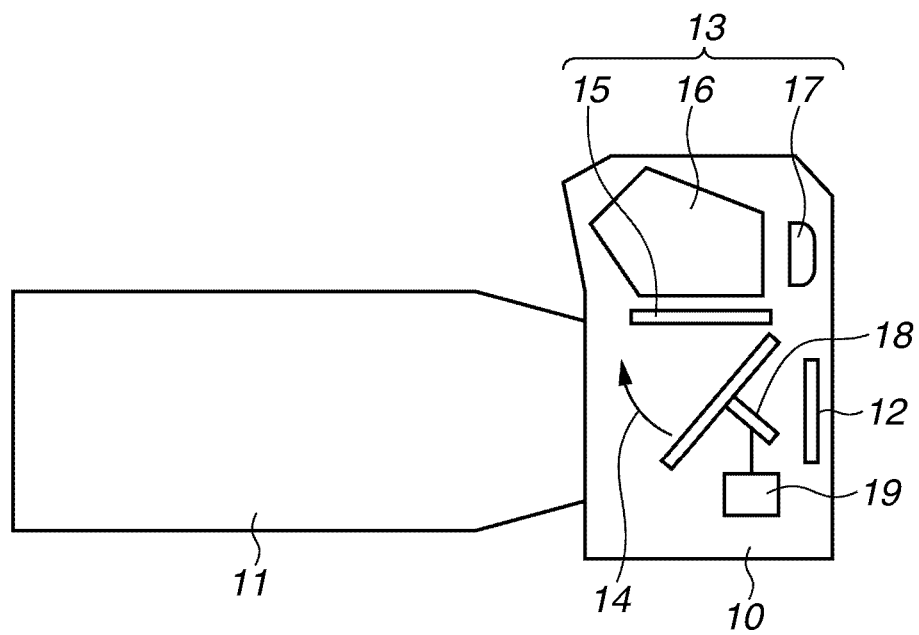
FIG. 13 is a schematic diagram illustrating main components of an optical apparatus according to an exemplary embodiment of the present invention.

Next, an exemplary embodiment of a single-lens reflex camera system (optical apparatus) using the photographic optical system according to each exemplary embodiment will be described with reference to FIG. 13. In FIG. 13, reference numeral 10 denotes a single-lens reflex camera body, and reference numeral 11 denotes an interchangeable lens on which the photographic optical system according to each exemplary embodiment is mounted. Reference numeral 12 denotes a recording unit, such as a film or an image sensor, for recording an object image obtained by the interchangeable lens 11. Reference numeral 13 denotes a viewfinder optical system for observing the object image from the interchangeable lens 11, and reference numeral 14 denotes a rotatable quick return mirror for switching the recording unit 12 and the finder optical system 13 to transmitting the object image from the interchangeable lens 11 thereto. In the case where the object image is observed via the viewfinder, the object image focused on a focusing screen 15 through the quick return mirror 14 is formed as an erect image by a pentagonal prism 16, and after that, the object image is magnified and observed via an eyepiece optical system 17. During photographing, the quick return mirror 14 is rotated in the arrow direction, so that the object image is focused and recorded on the recording unit 12. Reference numeral 18 denotes a sub-mirror, and reference numeral 19 denotes a focus detection device.

As described above, when the optical system according to each exemplary embodiment is applied to an optical apparatus such as an interchangeable lens of a single-lens reflex camera, it is possible to achieve an optical apparatus having high optical performance. In addition, the present embodiment can be adapted to a mirror-less single-lens reflex camera having no quick return mirror. The present invention is not limited to the above-described exemplary embodiments.

Next, numerical data of each exemplary embodiment will be described. In the numerical data of each exemplary embodiment, j denotes a surface number counted from the object side, and Aj denotes a light-beam effective diameter of the j-th surface. Rj denotes a radius of curvature of the j-th surface; Dj denotes a surface distance on the optical axis between the j-th surface and the (j+1)-th surface; and Nj and vj denote a refractive index and Abbe number of the j-th optical material with respect to d-line, respectively. f denotes a focal length of the optical system; Fno denotes aperture ratio; and ω denotes a half angle of view (degrees). In addition, an object distance is a distance from the first lens surface to the object.

In addition, when a shift amount from a surface vertex in the axial direction is denoted by X, a height from the optical axis in the direction perpendicular to the optical axis is denoted by r, a paraxial radius of curvature is denoted by R, a conic constant is denoted by k, and aspheric coefficients corresponding to respective orders are denoted by $C_2$, $C_4$, and $C_6$, the aspheric shape can be expressed by the following equation:

$$X(r) = \frac{(1/R)r^2}{1 + \sqrt{1 - (1+k)(r/R)^2}} + C_2 r^2 + C_4 r^4 + C_6 r^6 + \ldots \quad (25)$$

In addition, in each coefficient, "E±YY" denotes "×10$^{\pm YY}$". In addition, Table 1 lists values of the conditions (1) to (3) and (6) to (14) in each exemplary embodiment.

Table 1 lists the lenses LAj relating to the condition (1), the negative lenses LNi relating to the conditions (6) and (7), the positive lenses LPi relating to the conditions (8) and (9), and the negative lenses LMi relating to the conditions (10) and (11).

Numerical Example 1

| f | | 51.7 | |
|---|---|---|---|
| Fno | | 1.45 | |
| 2ω (degrees) | | 45.4 | |

RDN Data

| j | Aj | Rj | Dj | Nj | vj | |
|---|---|---|---|---|---|---|
| 1 | 49.30 | 223.8486 | 2.32 | 1.56883 | 56.36 | LN1 |
| 2 | 45.02 | 44.7577 | 21.39 | | | |
| 3 | 44.21 | 88.1828 | 3.51 | 1.81600 | 46.62 | LP1 |
| 4 | 44.21 | 1228.5981 | 2.40 | 1.59270 | 35.31 | LM1 |
| 5 | 44.19 | 236.3357 | 9.85 | | | |
| 6 | 45.40 | 90.1801 | 5.00 | 1.77250 | 49.60 | LP2 |
| 7 | 45.08 | −1662.6736 | 0.15 | | | |
| 8 | 42.73 | 36.0925 | 10.30 | 1.81600 | 46.62 | LP3 |
| 9 | 40.30 | −813.5864 | 0.51 | | | |
| 10 | 39.45 | −607.1973 | 2.20 | 1.72047 | 34.70 | LA1 |
| 11 | 32.48 | 25.8091 | 6.77 | | | |
| 12 | 32.11 | ∞ | 3.88 | SP | | |
| 13 | 31.70 | −46.7115 | 1.90 | 1.73800 | 32.26 | LA2 |
| 14 | 32.61 | 34.4670 | 1.59 | 1.62898 | 19.35 | LA3 |
| 15 | 32.64 | 51.2951 | 10.80 | 1.81600 | 46.62 | LP4 |
| 16 | 33.01 | −33.8333 | 0.20 | | | |
| 17 | 32.86 | −33.3060 | 1.80 | 1.72047 | 34.70 | LA4 |
| 18 | 33.31 | 45.5544 | 7.00 | 1.81600 | 46.62 | LP5 |
| 19 | 33.32 | −84.2793 | 0.15 | | | |
| 20 | 32.52 | 191.2213 | 3.80 | 1.81600 | 46.62 | LP6* |
| 21 | 32.05 | −106.1784 | 42.30 | | | |

Data of Variable Surface Distance

| | obj1 | obj2 |
|---|---|---|
| Object Distance | −1E+30 | −450 |
| D5 | 9.85 | 0.16 |
| D19 | 0.15 | 4.31 |
| D21 | 42.30 | 47.83 |

Data of Aspheric Surface

| Rj | Coefficient | Value |
|---|---|---|
| R20 | C4 | −1.680935E−06 |
| | C6 | 1.974577E−09 |
| | C8 | −4.462444E−12 |
| | C10 | −1.904203E−15 |
| | C12 | 1.377903E−17 |

Data of Refractive Indexes of Four Wavelengths

| | d | g | C | F |
|---|---|---|---|---|
| LA1 | 1.72047 | 1.74723 | 1.71437 | 1.73512 |
| LA2 | 1.73800 | 1.76768 | 1.73131 | 1.75418 |
| LA3 | 1.62898 | 1.67590 | 1.62026 | 1.65275 |
| LA4 | 1.72047 | 1.74723 | 1.71437 | 1.73512 |

(*Aspheric surface)

Numerical Example 2

| | f | 51.7 |
|---|---|---|
| | Fno | 1.45 |
| | 2ω (degrees) | 45.4 |

RDN Data

| j | Aj | Rj | Dj | Nj | νj | |
|---|---|---|---|---|---|---|
| 1 | 35.88 | 76.5654 | 2.60 | 1.51633 | 64.14 | LN1 |
| 2 | 34.81 | 31.8169 | 7.58 | | | |
| 3 | 37.27 | 62.5469 | 3.58 | 1.81600 | 46.62 | LP1 |
| 4 | 37.23 | 1033.9215 | 0.15 | | | |
| 5 | 37.01 | 32.1454 | 8.65 | 1.88300 | 40.76 | LP2 |
| 6 | 35.32 | −865.8256 | 0.15 | | | |
| 7 | 34.77 | 3749.8540 | 1.59 | 1.67270 | 32.10 | LM1 |
| 8 | 29.64 | 24.0118 | 6.57 | | | |
| 9 | 29.19 | ∞ | 4.81 | | | SP |
| 10 | 28.71 | −33.4053 | 1.70 | 1.73800 | 32.26 | LA1 |
| 11 | 30.55 | 39.9354 | 0.25 | | | |
| 12 | 30.86 | 41.0657 | 10.93 | 1.83481 | 42.71 | LP3 |
| 13 | 31.49 | −29.7291 | 1.46 | 1.62898 | 19.35 | LA2 |
| 14 | 31.49 | −24.0188 | 1.51 | 1.64769 | 33.79 | LM2 |
| 15 | 32.15 | 65.5474 | 0.51 | | | |
| 16 | 32.15 | 87.7880 | 6.44 | 1.59282 | 68.63 | LA3 |
| 17 | 32.36 | −39.6204 | 0.15 | | | |
| 18 | 30.77 | 79.0888 | 2.80 | 1.81600 | 46.62 | LP4* |
| 19 | 30.61 | −338.5736 | −0.18 | | | FC |
| 20 | 30.65 | ∞ | 41.19 | | | |

Data of Variable Surface Distance

| | obj1 | obj2 |
|---|---|---|
| Object Distance | −1E+30 | −450 |
| D19 | −0.18 | 5.93 |

Data of Aspheric Surface

| Rj | Coefficient | Value |
|---|---|---|
| R18 | C4 | −4.916962E−07 |
| | C6 | −1.249529E−09 |
| | C8 | 1.347173E−11 |
| | C10 | −4.271882E−14 |
| | C12 | 2.635938E−17 |

Data of Refractive Indexes of Four Wavelengths

| | d | g | C | F |
|---|---|---|---|---|
| LA1 | 1.73800 | 1.76768 | 1.73131 | 1.75418 |
| LA2 | 1.62898 | 1.67590 | 1.62026 | 1.65275 |
| LA3 | 1.59282 | 1.60354 | 1.59021 | 1.59884 |

(*Aspheric surface)

Numerical Example 3

| | f | 51.7 |
|---|---|---|
| | Fno | 1.25 |
| | 2ω (degrees) | 45.4 |

RDN Data

| j | Aj | Rj | Dj | Nj | νj | |
|---|---|---|---|---|---|---|
| 1 | 49.66 | 604.2548 | 2.28 | 1.56883 | 56.36 | LN1 |
| 2 | 45.60 | 49.2538 | 15.83 | | | |
| 3 | 49.34 | 87.0765 | 6.21 | 1.81600 | 46.62 | LP1 |
| 4 | 49.35 | −200.5937 | 2.40 | 1.59270 | 35.31 | LM1 |
| 5 | 49.22 | 231.3259 | 12.33 | | | |
| 6 | 50.55 | 81.9066 | 5.00 | 1.77250 | 49.60 | LP2 |
| 7 | 50.29 | 3693.1191 | 0.15 | | | |
| 8 | 46.95 | 37.5791 | 10.30 | 1.81600 | 46.62 | LP3 |
| 9 | 45.23 | −1744.5992 | 0.95 | | | |
| 10 | 43.74 | −537.9031 | 2.20 | 1.72047 | 34.70 | LA1 |
| 11 | 35.07 | 25.9413 | 7.71 | | | |
| 12 | 34.74 | ∞ | 4.40 | | | SP |
| 13 | 34.38 | −44.8389 | 1.90 | 1.73800 | 32.26 | LA2 |
| 14 | 35.85 | 37.0905 | 1.62 | 1.62898 | 19.35 | LA3 |
| 15 | 35.89 | 52.5070 | 10.80 | 1.81600 | 46.62 | LP4 |
| 16 | 36.22 | −34.1211 | 0.26 | | | |
| 17 | 35.98 | −33.5301 | 1.80 | 1.72047 | 34.70 | LA4 |
| 18 | 36.86 | 49.4912 | 7.00 | 1.81600 | 46.62 | LP5 |
| 19 | 36.91 | −87.0318 | 0.15 | | | |
| 20 | 35.95 | 130.4749 | 3.80 | 1.81600 | 46.62 | LP6* |
| 21 | 35.68 | −97.5057 | 39.07 | | | |

Data of Variable Surface Distance

| | obj1 | obj2 |
|---|---|---|
| Object Distance | −1E+30 | −354 |
| D5 | 12.33 | 0.15 |
| D19 | 0.15 | 5.05 |
| D21 | 39.07 | 46.35 |

Data of Aspheric Surface

| Rj | Coefficient | Value |
|---|---|---|
| R20 | C4 | −1.679931E−06 |
| | C6 | 3.056131E−09 |
| | C8 | −1.031510E−11 |
| | C10 | 1.776238E−14 |
| | C12 | −1.091756E−17 |

Data of Refractive Indexes of Four Wavelengths

| | d | g | C | F |
|---|---|---|---|---|
| LA1 | 1.72047 | 1.74723 | 1.71437 | 1.73512 |
| LA2 | 1.73800 | 1.76768 | 1.73131 | 1.75418 |
| LA3 | 1.62898 | 1.67590 | 1.62026 | 1.65275 |
| LA4 | 1.72047 | 1.74723 | 1.71437 | 1.73512 |

(*Aspheric surface)

Numerical Example 4

| | f | 51.7 |
|---|---|---|
| | Fno | 1.25 |
| | 2ω (degrees) | 45.4 |

RDN Data

| j | Aj | Rj | Dj | Nj | νj | |
|---|---|---|---|---|---|---|
| 1 | 42.16 | 103.0480 | 2.00 | 1.48749 | 70.23 | LN1 |
| 2 | 40.78 | 38.8351 | 7.88 | | | |
| 3 | 43.56 | 57.7814 | 11.12 | 1.81600 | 46.62 | LP1 |
| 4 | 43.03 | −76.9194 | 1.90 | 1.59270 | 35.31 | LM1 |
| 5 | 41.50 | 167.6488 | 0.15 | | | |
| 6 | 40.23 | 34.8830 | 7.30 | 1.83481 | 42.71 | LP2 |
| 7 | 37.66 | 70.6585 | 1.78 | 1.64769 | 33.79 | LM2 |
| 8 | 33.80 | 27.2413 | 7.36 | | | |
| 9 | 33.35 | ∞ | 5.62 | | | SP |
| 10 | 32.88 | −35.4470 | 1.70 | 1.73800 | 32.26 | LA1 |
| 11 | 35.75 | 35.7846 | 2.18 | 1.62898 | 19.35 | LA2 |
| 12 | 35.82 | 59.2698 | 11.40 | 1.81600 | 46.62 | LP3 |
| 13 | 36.44 | −29.4829 | 0.27 | | | |

-continued

| 14 | 36.18 | −28.9947 | 1.80 | 1.63980 | 34.46 | LM3 |
| 15 | 38.28 | 33.7654 | 11.10 | 1.81600 | 46.62 | LP4 |
| 16 | 38.28 | −61.0741 | 0.15 | | | |
| 17 | 35.69 | 113.9186 | 2.50 | 1.81600 | 46.62 | LP5* |
| 18 | 35.82 | −433.7771 | 39.95 | | | |

Data of Variable Surface Distance

| | obj1 | obj2 |
|---|---|---|
| Object Distance | −1E+30 | −450 |
| D18 | 39.95 | 45.92 |

Data of Aspheric Surface

| Rj | Coefficient | Value |
|---|---|---|
| R17 | C4 | −2.209763E−06 |
| | C6 | 1.439675E−09 |
| | C8 | −7.530991E−12 |
| | C10 | 5.877211E−15 |
| | C12 | −2.197704E−18 |

Data of Refractive Indexes of Four Wavelengths

| | d | g | C | F |
|---|---|---|---|---|
| LA1 | 1.73800 | 1.76768 | 1.73131 | 1.75418 |
| LA2 | 1.62898 | 1.67590 | 1.62026 | 1.65275 |

(*Aspheric surface)

Numerical Example 5

| f | 45.0 |
|---|---|
| Fno | 1.60 |
| 2ω (degrees) | 51.4 |

RDN Data

| j | Aj | Rj | Dj | Nj | νj | |
|---|---|---|---|---|---|---|
| 1 | 37.43 | 45.6784 | 1.79 | 1.48749 | 70.23 | LN1 |
| 2 | 33.89 | 27.1993 | 7.54 | | | |
| 3 | 31.40 | 62.3353 | 3.56 | 1.48749 | 70.23 | LN2 |
| 4 | 28.98 | 30.5580 | 3.17 | | | |
| 5 | 30.12 | 50.4044 | 5.34 | 1.77250 | 49.60 | LP1 |
| 6 | 30.27 | 6023.8644 | 0.13 | | | |
| 7 | 30.72 | 26.2974 | 8.08 | 1.81600 | 46.62 | LP2 |
| 8 | 29.01 | −1087.2754 | 0.13 | | | |
| 9 | 28.21 | 221.0155 | 1.50 | 1.72047 | 34.70 | LA1 |
| 10 | 24.69 | 20.5307 | 5.57 | | | |
| 11 | 24.46 | ∞ | 5.97 | | | SP |
| 12 | 23.85 | −34.6503 | 1.39 | 1.73800 | 32.26 | LA2 |
| 13 | 25.13 | 34.6415 | 0.54 | 1.62898 | 19.35 | LA3 |
| 14 | 25.18 | 40.9831 | 9.63 | 1.81600 | 46.62 | LP3 |
| 15 | 25.91 | −24.0282 | 0.32 | | | |
| 16 | 25.76 | −23.0131 | 1.57 | 1.72047 | 34.70 | LA4 |
| 17 | 27.07 | 36.9308 | 0.66 | 1.62898 | 19.35 | LA5 |
| 18 | 27.10 | 45.4608 | 6.07 | 1.81600 | 46.62 | LP4 |
| 19 | 27.31 | −40.0614 | 0.13 | | | |
| 20 | 29.04 | 118.7366 | 2.07 | 1.81600 | 46.62 | LP5* |
| 21 | 29.23 | −232.1772 | 39.80 | | | |

Data of Variable Surface Distance

| | obj1 | obj2 |
|---|---|---|
| Object Distance | −1E+30 | −400 |
| D21 | 39.80 | 45.80 |

Data of Aspheric Surface

| Rj | Coefficient | Value |
|---|---|---|
| R20 | C4 | −1.172296E−06 |
| | C6 | 3.742292E−10 |
| | C8 | −8.588073E−12 |
| | C10 | 4.254168E−14 |
| | C12 | −6.020091E−17 |

| | d | g | C | F |
|---|---|---|---|---|
| LA1 | 1.72047 | 1.74723 | 1.71437 | 1.73512 |
| LA2 | 1.73800 | 1.76768 | 1.73131 | 1.75418 |
| LA3 | 1.62898 | 1.67590 | 1.62026 | 1.65275 |
| LA4 | 1.72047 | 1.74723 | 1.71437 | 1.73512 |
| LA5 | 1.62898 | 1.67590 | 1.62026 | 1.65275 |

(*Aspheric surface)

Numerical Example 6

| f | 60.0 |
|---|---|
| Fno | 1.85 |
| 2ω (degrees) | 39.7 |

RDN Data

| j | Aj | Rj | Dj | Nj | νj | |
|---|---|---|---|---|---|---|
| 1 | 33.03 | 63.6218 | 2.53 | 1.51633 | 64.14 | LN1 |
| 2 | 31.50 | 28.0413 | 7.48 | | | |
| 3 | 34.20 | 49.2638 | 6.07 | 1.77250 | 49.60 | LP1 |
| 4 | 33.94 | 287.7197 | 0.19 | | | |
| 5 | 33.75 | 29.7419 | 7.76 | 1.80400 | 46.57 | LP2 |
| 6 | 32.21 | 3312.7845 | 0.19 | | | |
| 7 | 31.40 | 237.8351 | 3.43 | 1.72047 | 34.70 | LA1 |
| 8 | 26.22 | 21.3539 | 5.93 | | | |
| 9 | 25.99 | ∞ | 4.42 | | | SP |
| 10 | 25.72 | −31.7872 | 2.15 | 1.72047 | 34.70 | LA2 |
| 11 | 27.36 | 84.3224 | 7.50 | 1.77250 | 49.60 | LP3 |
| 12 | 28.07 | −28.8602 | 1.45 | | | |
| 13 | 27.32 | −29.5960 | 2.23 | 1.72047 | 34.70 | LA3 |
| 14 | 28.72 | 74.0406 | 0.68 | 1.62898 | 19.35 | LA4 |
| 15 | 28.76 | 117.2682 | 4.44 | 1.77250 | 49.60 | LP4 |
| 16 | 29.01 | −47.1016 | 0.19 | | | |
| 17 | 28.61 | 448.2550 | 2.56 | 1.78800 | 47.37 | LP5* |
| 18 | 28.51 | −68.8189 | 50.56 | | | |

Data of Variable Surface Distance

| | obj1 | obj2 |
|---|---|---|
| Object Distance | −1E+30 | −540 |
| D18 | 50.56 | 58.19 |

Data of Aspheric Surface

| Rj | Coefficient | Value |
|---|---|---|
| R17 | C4 | −9.282999E−07 |
| | C6 | 3.970627E−09 |
| | C8 | −9.833721E−12 |
| | C10 | −1.296806E−14 |
| | C12 | 6.746891E−17 |

Data of Refractive Indexes of Four Wavelengths

| | d | g | C | F |
|---|---|---|---|---|
| LA1 | 1.72047 | 1.74723 | 1.71437 | 1.73512 |
| LA2 | 1.72047 | 1.74723 | 1.71437 | 1.73512 |

-continued

| | | | | | |
|---|---|---|---|---|---|
| LA3 | 1.72047 | 1.74723 | 1.71437 | 1.73512 | |
| LA4 | 1.62898 | 1.67590 | 1.62026 | 1.65275 | |

(*Aspheric surface)

TABLE 1

| | | Numerical Example | | | | | |
|---|---|---|---|---|---|---|---|
| Condition | | 1 | 2 | 3 | 4 | 5 | 6 |
| (1) | LA1 | 0.0075 | 0.0071 | 0.0075 | 0.0071 | 0.0075 | 0.0075 |
| | LA2 | 0.0071 | 0.0926 | 0.0071 | 0.0926 | 0.0071 | 0.0075 |
| | LA3 | 0.0926 | 0.0383 | 0.0926 | — | 0.0926 | 0.0075 |
| | LA4 | 0.0075 | — | 0.0075 | — | 0.0075 | 0.0926 |
| | LA5 | — | — | — | — | 0.0926 | — |
| (2) | | 0.0019 | 0.0017 | 0.0020 | 0.0018 | 0.0016 | 0.0012 |
| (3) | | −0.163 | −0.195 | −0.184 | −0.191 | −0.273 | −0.222 |
| (6) | LN1 | 1.56883 | 1.51633 | 1.56883 | 1.48749 | 1.48749 | 1.51633 |
| | LN2 | — | — | — | — | 1.48749 | — |
| (7) | LN1 | 56.36 | 64.14 | 56.36 | 70.23 | 70.23 | 64.14 |
| | LN2 | — | — | — | — | 70.23 | — |
| (8) | LP1 | 1.81600 | 1.81600 | 1.81600 | 1.81600 | 1.77250 | 1.77250 |
| | LP2 | 1.77250 | 1.88300 | 1.77250 | 1.83481 | 1.81600 | 1.80400 |
| | LP3 | 1.81600 | 1.83481 | 1.81600 | 1.81600 | 1.81600 | 1.77250 |
| | LP4 | 1.81600 | 1.81600 | 1.81600 | 1.81600 | 1.81600 | 1.77250 |
| | LP5 | 1.81600 | — | 1.81600 | 1.81600 | 1.81600 | 1.78800 |
| | LP6 | 1.81600 | — | 1.81600 | — | — | — |
| (9) | LP1 | 46.20 | 46.62 | 46.62 | 46.62 | 49.60 | 49.60 |
| | LP2 | 49.60 | 40.76 | 49.60 | 42.71 | 46.62 | 46.57 |
| | LP3 | 46.62 | 42.71 | 46.62 | 46.62 | 46.62 | 49.60 |
| | LP4 | 46.62 | 46.62 | 46.62 | 46.62 | 46.62 | 49.60 |
| | LP5 | 46.62 | — | 46.62 | 46.62 | 46.62 | 47.37 |
| | LP6 | 46.62 | — | 46.62 | — | — | — |
| (10) | LM1 | 1.59270 | 1.67270 | 1.59270 | 1.59270 | — | — |
| | LM2 | — | 1.64769 | — | 1.64769 | — | — |
| | LM3 | — | — | — | 1.63980 | — | — |
| (11) | LM1 | 35.31 | 32.10 | 35.31 | 35.31 | — | — |
| | LM2 | — | 33.79 | — | 33.79 | — | — |
| | LM3 | — | — | — | 34.46 | — | — |
| (12) | | 1.45 | 1.45 | 1.25 | 1.25 | 1.60 | 1.85 |
| (13) | | 0.82 | 0.80 | 0.76 | 0.77 | 0.86 | 0.82 |
| (14) | | 45.4 | 45.4 | 45.4 | 45.4 | 51.4 | 39.7 |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-195997 filed Sep. 8, 2011, which is hereby incorporated by reference herein in its entirety.

What is claimed is:

1. An optical system comprising:
a negative lens unit including one or more negative lenses located closest to an object side; and
a positive lens unit having positive refractive power including a plurality of lenses on an image side of the negative lens unit,
wherein, when a portion of lenses among the plurality of the lenses constituting the positive lens unit is denoted by lenses LAj where j is an integer equal to or greater than 1 in order from the object side, and an anomalous partial dispersion ratio of a material of the lens LAj is denoted by $\Delta\theta gFAj$, the following condition is satisfied:

$$\Delta\theta gFAj > 0.0025,$$

and
wherein, when the one or more negative lenses are denoted by negative lenses LNi where i is an integer equal to or greater than 1 in order from the object side, a focal length of the negative lens LNi and a refractive index of a material thereof are denoted by fni and Nni, respectively, a focal length of the lens LAj is denoted by fAj, a refractive index, Abbe number, and partial dispersion ratio of a material of the lens LAj are denoted by NAj, vdAj, and $\theta gFAj$, respectively, a focal length of the entire optical system is denoted by f, and a full aperture F-number during focusing on an infinitely distant object is denoted by Fno, and when following relational equations are set:

$$kj = 0.07 (fAj > 0)$$

$$kj = -0.05 (fAj < 0)$$

$$\Delta\theta gFAj = \theta gFAj - (-0.0023 \cdot vdAj + 0.6641)(fAj > 0)$$

$$\Delta\theta gFAj = (-0.0025 \cdot vdAj + 0.6777) - \theta gFAj (fAj < 0),$$

where kj denotes a rate of change in refractive index, the following conditions are satisfied:

$$\Sigma |(\Delta\theta gFAj/vdAj) \cdot (f/fAj)/Fno| > 0.001$$

$$-0.3 < f \cdot \{\Sigma kj/(NAj \cdot fAj) + \Sigma 1/(Nni \cdot fni)\} < 0.2.$$

2. The optical system according to claim 1, wherein, when an Abbe number of a material of the negative lens LNi constituting the negative lens unit is denoted by vdni, the following conditions are satisfied:

$$Nni < 1.65$$

$$vdni > 50.$$

3. The optical system according to claim 1, wherein, when a refractive index and Abbe number of a material of one positive lens LPp excluding the lens LAj among the lenses constituting the positive lens unit are denoted by NLPp and vdLPp, respectively, the following conditions are satisfied:

$NLPp>1.70$ $vdLPp>30.$

4. The optical system according to claim 1, wherein, when a refractive index and Abbe number of a material of one negative lens LMn among negative lenses LMi excluding the lens LAj constituting the positive lens unit and the negative lens LNi constituting the negative lens unit are denoted by NLMn and vdLMn, respectively, the following conditions are satisfied:

$NLMn<1.75$ $vdLMn<40.$

5. The optical system according to claim 1, further comprising an aperture stop between adjacent lenses in the optical system,
   wherein a lens system located on the object side of the aperture stop and a lens system located on the image side of the aperture stop have positive refractive power, and lens surfaces on the object side and the image side facing the aperture stop have a concave shape.

6. The optical system according to claim 1, wherein the following condition is satisfied:

$0.9<Fno<2.0.$

7. The optical system according to claim 1, wherein, when a distance from a lens surface closest to the image side to an image point on an optical axis is denoted by Bf, the following condition is satisfied:

$Bf/f<1.$

8. An optical apparatus comprising:
   an optical system; and
   a solid-state image sensor configured to photoelectrically convert an image formed by the optical system,
   the optical system comprising:
   a negative lens unit including one or more negative lenses located closest to an object side; and
   a positive lens unit having positive refractive power including a plurality of lenses on an image side of the negative lens unit,
   wherein, when a portion of lenses among the plurality of the lenses constituting the positive lens unit is denoted by lenses LAj where j is an integer equal to or greater than 1 in order from the object side, and an anomalous partial dispersion ratio of a material of the lens LAj is denoted by $\Delta\theta gFAj$, the following condition is satisfied:

$\Delta\theta gFAj>0.0025,$ and
   wherein, when the one or more negative lenses are denoted by negative lenses LNi where i is an integer equal to or greater than 1 in order from the object side, a focal length of the negative lens LNi and a refractive index of a material thereof are denoted by fni and Nni, respectively, a focal length of the lens LAj is denoted by fAj, a refractive index, Abbe number, and partial dispersion ratio of a material of the lens LAj are denoted by NAj, vdAj, and $\theta gFAj$, respectively, a focal length of the entire optical system is denoted by f, and a full aperture F-number during focusing on an infinitely distant object is denoted by Fno, and when following relational equations are set:

$kj=0.07 (fAj>0)$ $kj=-0.05 (fAj<0)$ $\Delta\theta gFAj=\theta gFAj-(-0.0023\cdot vdAj+0.6641)(fAj>0)$ $\Delta\theta gFAj=(-0.0025\cdot vdAj+0.6777)-\theta gFAj(fAj<0),$ where kj denotes a rate of change in refractive index, the following conditions are satisfied:

$\Sigma|(\Delta\theta gFAj/vdAj)\cdot(f/fAj)/Fno|>0.001$ $-0.3<f\cdot\{\Sigma kj/(NAj\cdot fAj)+\Sigma 1/(Nni\cdot fni)\}<0.2.$ 9. The optical apparatus according to claim 8, wherein, when a photographic angle of view of the optical system is denoted by $2\omega$, the following condition is satisfied:

$30<2\omega<56,$ where the photographic angle of view of the optical system $2\omega$ is expressed in degrees.

* * * * *